US012619558B2

(12) United States Patent
Granovsky et al.

(10) Patent No.: US 12,619,558 B2
(45) Date of Patent: May 5, 2026

(54) MEMORY CONTROLLER RESERVATION OF RESOURCES FOR CACHE HIT

(71) Applicant: Apple Inc., Cupertino, CA (US)

(72) Inventors: Ilya Granovsky, Kiryat Tivon (IL);
Jurgen M. Schulz, Pleasanton, CA
(US); Tom Greenshtein, Haifa (IL);
Elli Bagelman, Haifa (IL)

(73) Assignee: Apple Inc., Cupertino, CA (US)

( * ) Notice: Subject to any disclaimer, the term of this
patent is extended or adjusted under 35
U.S.C. 154(b) by 0 days.

(21) Appl. No.: 18/819,877

(22) Filed: Aug. 29, 2024

(65) Prior Publication Data

US 2025/0103477 A1      Mar. 27, 2025

Related U.S. Application Data

(60) Provisional application No. 63/584,727, filed on Sep.
22, 2023, provisional application No. 63/584,716,
filed on Sep. 22, 2023.

(51) Int. Cl.
G06F 13/16          (2006.01)
G06F 12/02          (2006.01)
(Continued)

(52) U.S. Cl.
CPC ...... G06F 13/1642 (2013.01); G06F 12/0223
(2013.01); G06F 12/0815 (2013.01);
(Continued)

(58) Field of Classification Search
None
See application file for complete search history.

(56) References Cited

U.S. PATENT DOCUMENTS

| | | | | |
|---|---|---|---|---|
| 5,226,009 A | * | 7/1993 | Arimoto | ............. G06F 12/0893 |
| | | | | 365/189.04 |
| 7,502,914 B2 | | 3/2009 | Dhodapkar | |

(Continued)

FOREIGN PATENT DOCUMENTS

JP          7384534 B2     11/2023

OTHER PUBLICATIONS

Abousamra et al. Proactive Circuit Allocation in Multiplane NoCs.
IEEE Xplore, Jun. 2013, pp. 10 (Year: 2013).*

*Primary Examiner* — Kaushikkumar M Patel
(74) *Attorney, Agent, or Firm* — Kowert, Hood, Munyon,
Rankin & Goetzel, P.C.; Dean M. Munyon

(57) ABSTRACT

A memory controller circuit manages access to a memory
cache circuit and storage circuits. The memory controller
receives a memory access request, and attempts to reserve
entries in a first set of storage circuits that are needed to
process a cache hit prior to determining whether the memory
access request hits in the memory cache circuit. This reser-
vation attempt is performed without attempting to reserve
other sets of storage circuits that are needed to process other
possible outcomes of the memory access request, including
a cache miss. If the memory controller circuit has success-
fully reserved entries in all of the first set of storage circuits,
processing of the memory access request may be initiated.
Conversely, if the memory controller is unable to reserve an
entry in at least one of the first set of storage circuits,
processing of the memory access request is inhibited.

20 Claims, 22 Drawing Sheets

(51) Int. Cl.
    *G06F 12/0815*     (2016.01)
    *G06F 12/0831*     (2016.01)
    *G06F 12/12*     (2016.01)

(52) U.S. Cl.
    CPC .......... *G06F 12/0831* (2013.01); *G06F 12/12*
        (2013.01); *G06F 13/1673* (2013.01); *G06F*
        *2212/1008* (2013.01); *G06F 2212/1024*
        (2013.01)

(56) References Cited

U.S. PATENT DOCUMENTS

| | | | |
|---|---|---|---|
| 2006/0184738 | A1* | 8/2006 | Bridges ................. G06F 9/3824 |
| | | | 712/E9.047 |
| 2014/0046979 | A1* | 2/2014 | Onodera ................. G06F 13/16 |
| | | | 707/783 |
| 2015/0127907 | A1* | 5/2015 | Fahim ................. G06F 12/0831 |
| | | | 711/120 |
| 2016/0239418 | A1* | 8/2016 | Drapala ................. G06F 12/084 |
| 2017/0242798 | A1* | 8/2017 | Saha .................... G06F 12/0842 |
| 2020/0050548 | A1* | 2/2020 | Kotha ................. G06F 12/0815 |
| 2020/0410323 | A1 | 12/2020 | Vinod et al. |
| 2021/0064541 | A1 | 3/2021 | Kothinti Naresh et al. |
| 2022/0058121 | A1 | 2/2022 | Hornung et al. |
| 2022/0091980 | A1* | 3/2022 | Kayiran ............. G06F 13/1668 |
| 2023/0142598 | A1 | 5/2023 | Xu |
| 2023/0251894 | A1* | 8/2023 | Brewer .................. G06F 9/466 |
| | | | 345/76 |

\* cited by examiner

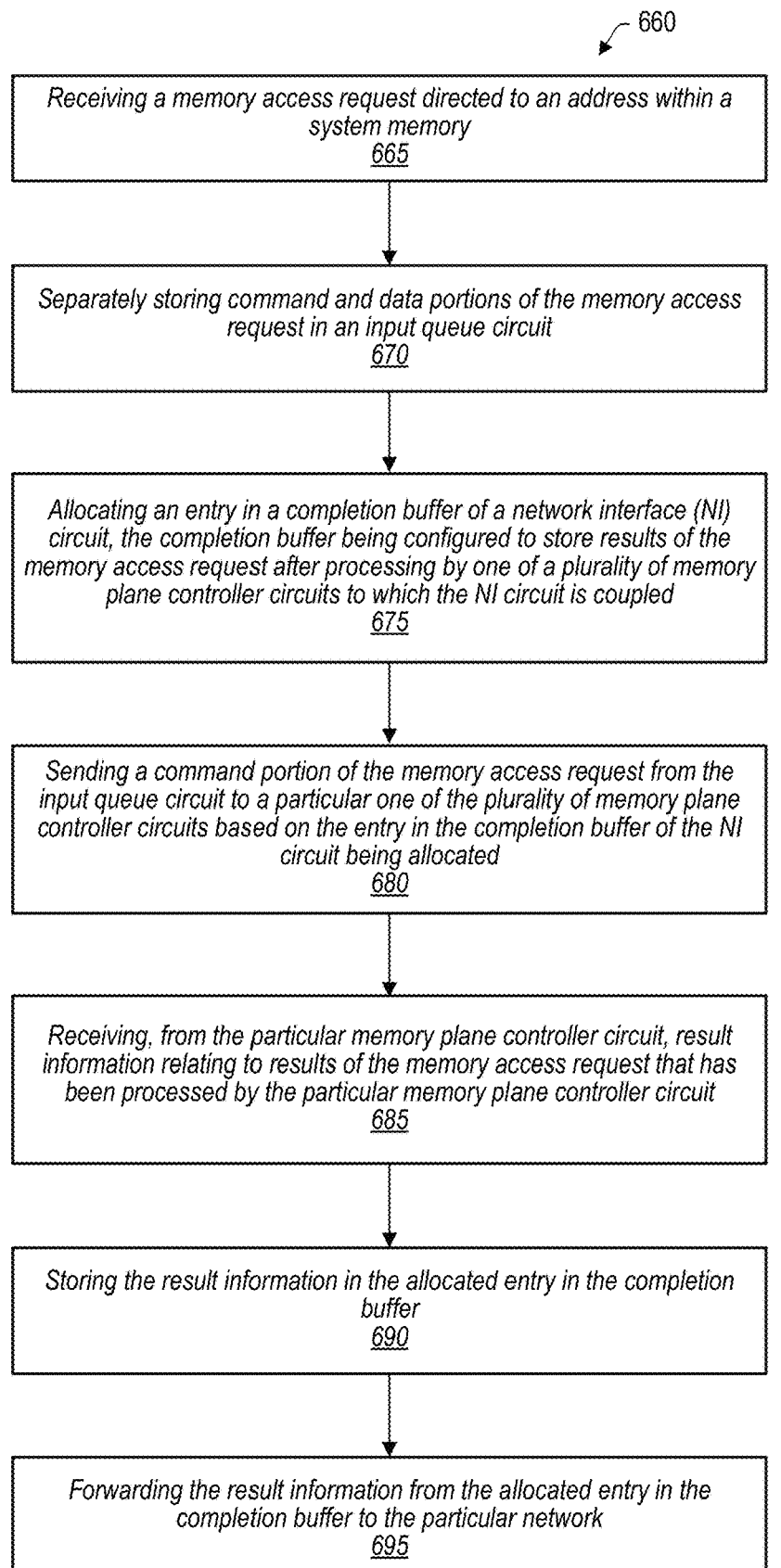

*— 660*

Receiving a memory access request directed to an address within a system memory
665

Separately storing command and data portions of the memory access request in an input queue circuit
670

Allocating an entry in a completion buffer of a network interface (NI) circuit, the completion buffer being configured to store results of the memory access request after processing by one of a plurality of memory plane controller circuits to which the NI circuit is coupled
675

Sending a command portion of the memory access request from the input queue circuit to a particular one of the plurality of memory plane controller circuits based on the entry in the completion buffer of the NI circuit being allocated
680

Receiving, from the particular memory plane controller circuit, result information relating to results of the memory access request that has been processed by the particular memory plane controller circuit
685

Storing the result information in the allocated entry in the completion buffer
690

Forwarding the result information from the allocated entry in the completion buffer to the particular network
695

FIG. 6B

MEMORY CONTROLLER RESERVATION OF RESOURCES FOR CACHE HIT

CROSS REFERENCE TO RELATED APPLICATIONS

This application claims priority to U.S. Provisional Application Nos. 63/584,716 entitled "Memory Controller Reservation of Retry Queue" and filed on Sep. 22, 2023; and 63/584,727 entitled "Memory Controller Reservation of Resources for Cache Hit," also filed on Sep. 22, 2023. Both of these provisional applications are incorporated by reference herein in their entireties.

The present application is also related to U.S. application Ser. No. 18/819,755, entitled "Memory Controller Reservation of Retry Queue," filed on the same day as the present application.

BACKGROUND

Technical Field

This application relates generally to computer systems, and more specifically to processing memory transactions within such systems.

Description of the Related Art

Computers are comprised of diverse hardware components, each responsible for specific tasks within the system. These components typically include on-chip central processing units (CPUs), graphics processors units (GPUs) input/output devices, input/output interfaces, often alongside other components such as radio modems. Furthermore, these components may communicate with each other and with memory components to store and modify information relating to their operation.

As such, computer components may access various types of memory components. Memory components include Random Access Memory (RAM), which provides fast, temporary storage for actively used data. One example of RAM is Dynamic RAM (DRAM), a type of volatile computer memory that stores data in a digital format as electrical charges in capacitors and is commonly used as the main memory in computers.

Facilitating communication between computer components and memory is the memory controller circuit, which is hardware responsible for managing data transactions between the computer components and various memory modules. Memory controller circuits exhibit diverse technical designs based on their context. For instance, memory controller circuits for high-performance computing clusters may emphasize parallelism between multiple components, while those for embedded systems may instead prioritize power efficiency. In a computer system with many components, a memory controller circuits acts as an interface between various components and memory modules, overseeing memory management tasks.

BRIEF DESCRIPTION OF THE DRAWINGS

FIG. 6B is a flow diagram of one embodiment of a method for interfacing with a memory controller circuit of a computer system by a network interface circuit.

DETAILED DESCRIPTION

Overview

Figure 1A:
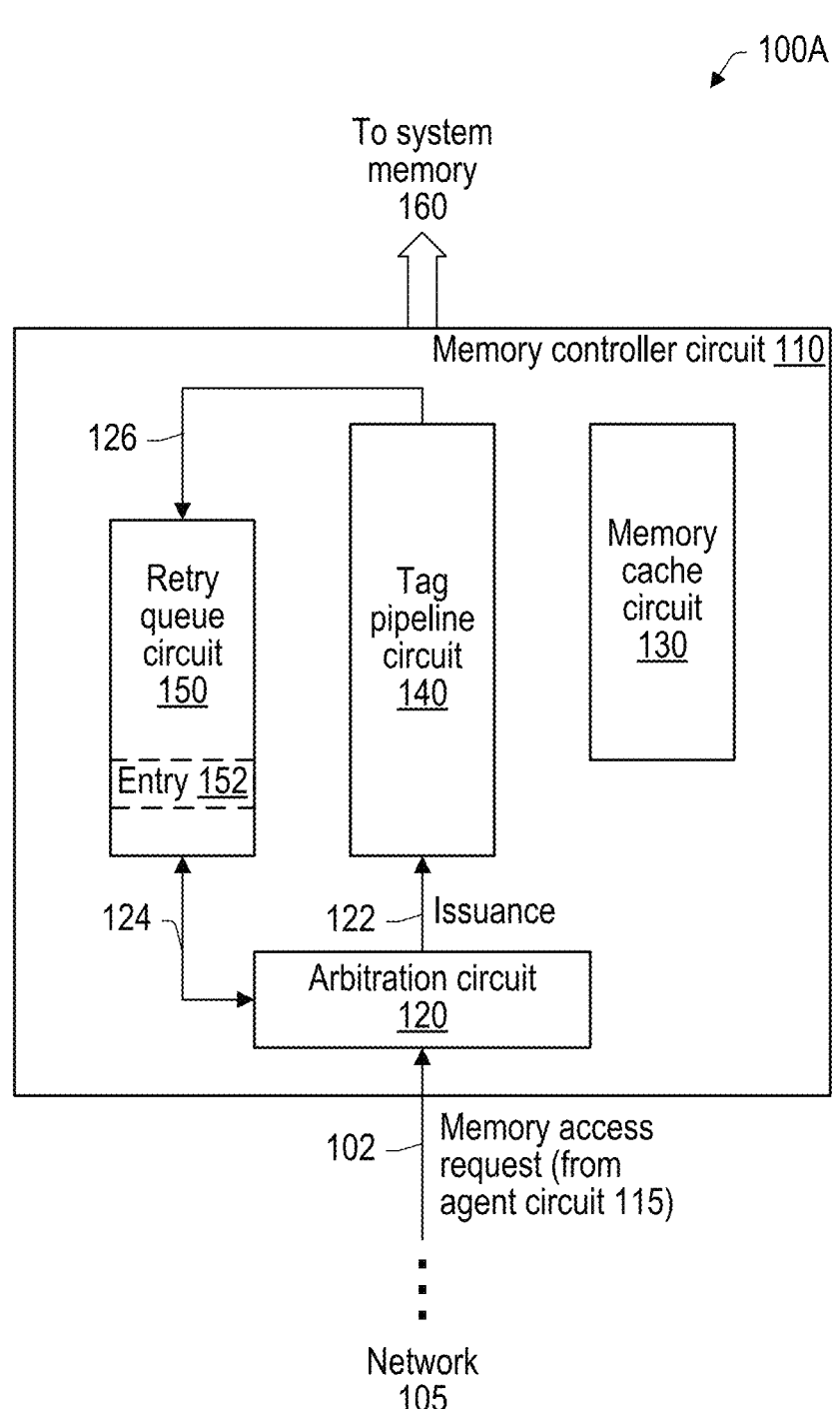
FIG. 1A is a block diagram of one embodiment of a memory controller circuit configured to reserve an entry in a retry queue circuit.

The present disclosure generally concerns memory controller circuits and associated hardware. Structure and techniques for a memory controller circuit that is configured to accept memory access requests from a source agent circuit on a network by reserving entries in a retry queue circuit are described with respect to FIGS. 1-6 in a section entitled "Reservation of Retry Queue Circuit." Structure and techniques for a memory controller circuit that is configured to optimize reservation of resources are then described with respect to FIGS. 7-12 in a section entitled "Reservation of Resources for Memory Cache Hit." As will be described, the structure and techniques described in each section can be used together or independently. The disclosure concludes by providing examples of potential systems in which the circuitry embodying any of the disclosed structure and techniques may be incorporated (with reference to FIG. 13), examples of computer-readable media storing design information usable to manufacture disclosed circuitry (with reference to FIG. 14).

Reservation of Retry Queue Circuit

A previous memory controller circuit implementation by the present assignee included a control circuit that was coupled to a network interface of a network. This control circuit included current transaction tables (CTTs) and completion buffers for each source network. Additionally, the control circuit included arbitration logic for each of a group of plane controller circuits, where each plane was responsible for a different portion of a system memory that included DRAM. Each plane controller circuit had its own version of certain common elements (e.g., memory cache circuit, tag pipeline circuit, data pipeline circuit), and the totality of the memory controller circuit was the combination of the planes coupled to the common control circuit. Each plane controller circuit in this implementation also interfaced with at least one memory channel unit (MCU) circuit that controlled the memory channel to main memory for which the cache in the plane controller was caching data.

In this past implementation, a path for a request from the network through the memory controller circuit and back out to the network included traversing the following sequence of components: network switch→network interface (NI) circuit→CTT→plane crossbar→arbitration for resources such as the memory tag pipeline→plane→completion buffer (in the controller circuit)→NI→network switch. In some cases, a memory access request being handled in the plane controller may need to be retried, and may thus be sent to a retry handling queue (also referred to as RHQ, or, more generally throughout this disclosure, as a "retry queue circuit") if not all of the needed resources are available to complete the request. (Various examples of possible resources, such as a snoop queue circuit, are described at length below.) In some cases, a memory access request would need to be returned to the CTTs and the network for resubmission. In this implementation, the CTTs and the NI ended up right next to each other in the physical layout of the integrated circuit (IC) that included the memory controller circuit, with the result that transactions were simply moving from one buffer directly to another buffer within the memory path. It is recognized by the present inventors that this additional buffering increased latencies, IC area, and power consumption for a computer system that included such an implementation of a memory controller circuit.

To address these issues, a new implementation of a memory controller circuit disclosed herein moves the function of the CTTs to a combination of 1) buffers in the NI circuit and 2) the retry queue circuit. The common control portion has been eliminated relative to the prior implementation, and the function of arbitration for the tag pipeline circuit has been moved into the memory controller circuit itself. The completion buffers in this new implementation are located in the NI circuit.

Figure 1B:
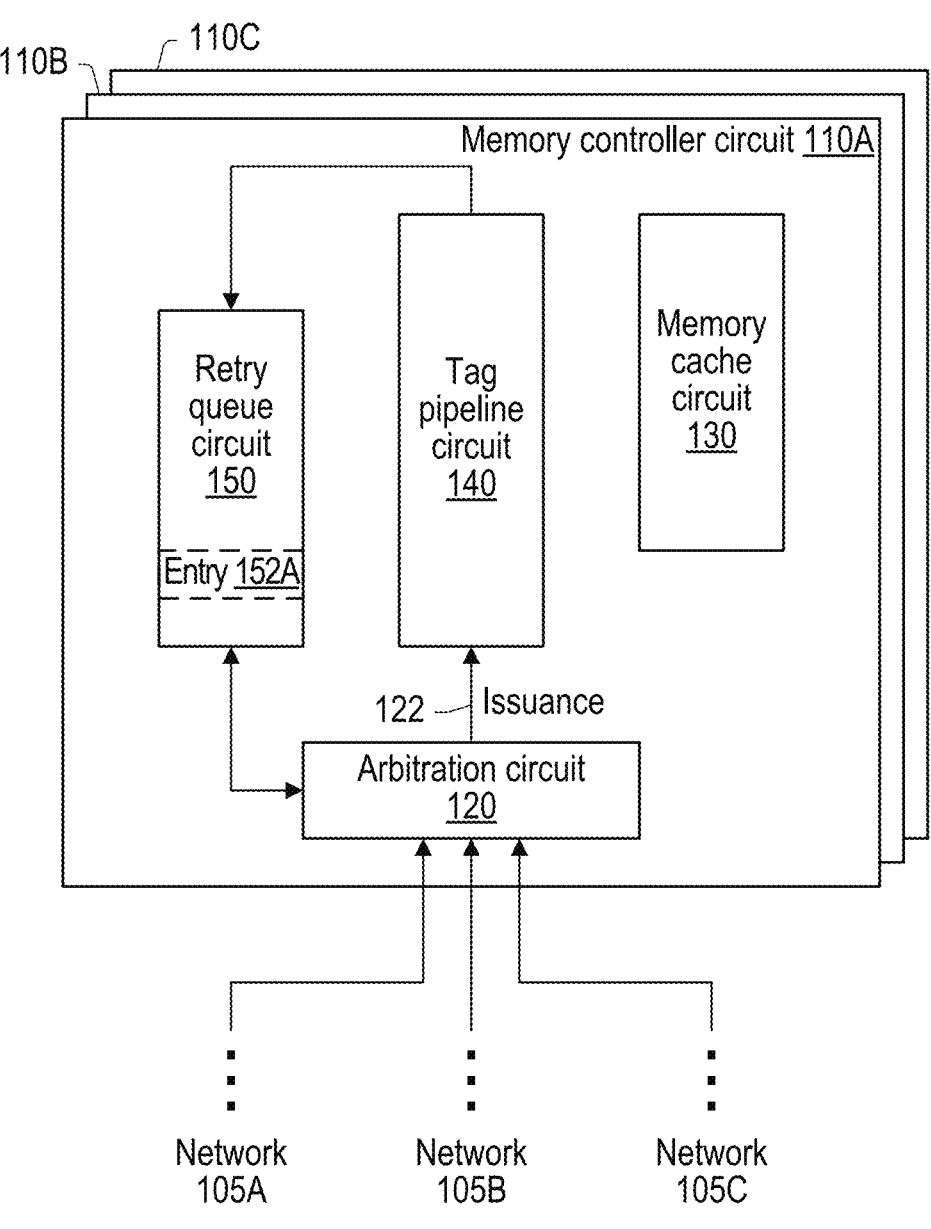
FIG. 1B is a block diagram of one embodiment of a memory plane controller circuit configured to reserve an entry in a retry queue circuit.

Embodiments of such a design are illustrated in FIGS. 1A-B. FIG. 1A illustrates a block diagram of a single memory controller circuit 110, while FIG. 1B illustrates a block diagram of a set of multiple memory controller circuits, indicated by reference numerals 110A-C. Memory controller circuits 110A-C can each be referred to as "memory plane controller circuits" because each circuit addresses a different "plane" or portion of a system memory.

As shown, FIG. 1A depicts a computer system 100A that is implemented one or more co-packaged integrated circuit (IC) dies. A computer system implemented on a single IC die is a System-on-a-chip (SoC or SOC) design. A computer system implemented on two or more IC dies, on the other hand, is a chiplet design.

Computer system 100A includes a memory controller circuit 110 that is configured to accept memory access requests such as memory access request 102 over a network 105. As will be described below, memory access request 102 originates from a so-called agent circuit 115. One possible example of an agent circuit 115 is a processor circuit such as a central processing unit (CPU). Further detail regarding agent circuits is provided below in a sub-section entitled "Agent Circuits." Memory access request 102 can be a load (read) or store (write) request in various embodiments. Memory controller circuit 110 may be able to satisfy request 102 from memory cache 130 circuit (which may either be located within memory controller circuit 110 or external to it in various embodiments), or by accessing system memory 160.

In one embodiment, memory controller circuit 110 includes an arbitration circuit 120, memory cache circuit 130, a tag pipeline circuit 140, and a retry queue circuit 150. After receiving memory access request 102, arbitration circuit 120 (one embodiment of which is described in more detail in FIG. 2) is configured to reserve one of multiple entries in retry queue circuit 150 via interface 124 in FIG. 1A, which results in reservation of entry 152).

Retry queue circuit 150 has a plurality of entries configured to store information for memory access requests that, during a given pass through tag pipeline circuit 140, are determined to require another pass through tag pipeline circuit 140. Reservation of entry 152 guarantees that if memory access request 102 needs to utilize retry queue circuit 150 during processing, that resource will be available. Accordingly, lack of availability of retry queue circuit 150 will not cause the memory access request 102 to be returned to network 105 for resubmission to arbitration circuit 120.

As used in this disclosure, "reservation" of an entry in a storage circuit refers to any process or technique by which an entry is assigned to a particular request, thereby guaranteeing access to that resource when and if it is needed. Reserving entry 152 may be performed, for example, using a network credit scheme. More details on such schemes are provided below in the sub-section entitled "Preventing Deadlock Via Credit Schemes." The present disclosure is not intended to be limited, however, in the means by which an entry such as entry 152 may be reserved.

Arbitration circuit 120 is configured to store various memory access requests at a given time, and arbitrates between these entries to select one of the stored memory access requests for issuance 122 to tag pipeline circuit. Tag pipeline circuit 140 (described in more detail in FIG. 3A) is configured to access a directory pipeline circuit (not pictured) to determine if the address specified by memory access request 102 is located in memory cache circuit 130. During processing by tag pipeline circuit 140, it may be determined that memory access request 102 cannot be fulfilled during a single pass through tag pipeline circuit 140. For example, the request may address a locked cache line, or a resource such as a snoop queue circuit may be unavailable.

In such a case, tag pipeline circuit 140 can communicate via interface 126 to store information about memory access request 102 in retry queue circuit 150. Subsequently, this information for request 102 can be sent back to arbitration circuit 120 via interface 124, where request 102 can again be selected for issuance 122 to tag pipeline circuit 140 at a later time.

To recap, FIG. 1A depicts an apparatus that includes memory controller circuit (110) of a computer system (100A) implemented on one or more co-packaged integrated circuit dies. The memory controller circuit includes an arbitration circuit (120) configured to receive a memory access request (102) originating from a network (105). The memory controller circuit also includes a memory cache circuit (130) and a tag pipeline circuit (140) configured to determine whether the memory access request hits in the memory cache circuit. Still further, the memory controller circuit includes a retry queue circuit (150) having a plurality of entries configured to store information for memory access requests that, during a given pass through the tag pipeline circuit, are determined to require another pass through the tag pipeline circuit. The arbitration circuit is configured to reserve an entry in the retry queue circuit for the memory access request. Furthermore, the arbitration circuit is configured to select the memory access request for issuance to the tag pipeline circuit as a result of an arbitration process and based on availability of the entry for reservation. Reservation of the entry in the retry queue circuit guarantees that lack of availability of the retry queue circuit will not cause the memory access request to be returned to the network for resubmission to the arbitration circuit.

The paradigm of FIG. 1A can be said to establish a "hard boundary" for memory access requests received from network 105. In contrast to previous implementations, once memory access request 102 is received at memory controller circuit 110 from network 105, such a request is guaranteed not to be returned to circuitry external to memory controller circuit 110 for resubmission. This guarantee can be made because requests 102 received at arbitration circuit will have corresponding entry available within retry queue circuit based upon a prior reservation.

FIG. 1B depicts a computer system 100B in which memory controller circuit 110 is one of a plurality of memory controller circuits that are specified by reference numerals 110A-C. (Note that references to computer system 100 throughout this disclosure contemplate both computer systems 100A-B.) Each memory controller circuit 110, in one embodiment, may be responsible for a portion (or plane) of the memory address space of system memory 160. For this reason, memory controller circuits 110 in FIG. 1B may be referred to as a memory plane controller circuit. Memory plane controller circuits 110 are configured to operate in parallel with one another to provide greater memory throughput.

Additionally, FIG. 1B depicts that each memory plane controller circuit 110 may be configured to receive memory access requests from multiple different networks 105A-C within computer system 100B. For example, in one embodiment, network 105A may be a network that includes various processing circuits (e.g., CPU cores), while network 105B is a network that includes various I/O devices and network 105C is a network that includes graphics processing units (GPUs). More details on potential embodiments of networks 105 are provided below in the sub-section entitled "Networks." Accordingly, a given arbitration circuit 120 within memory plane controller circuit 110 may be configured to store, at a given time, memory access requests from various different networks 105.

Figure 2:
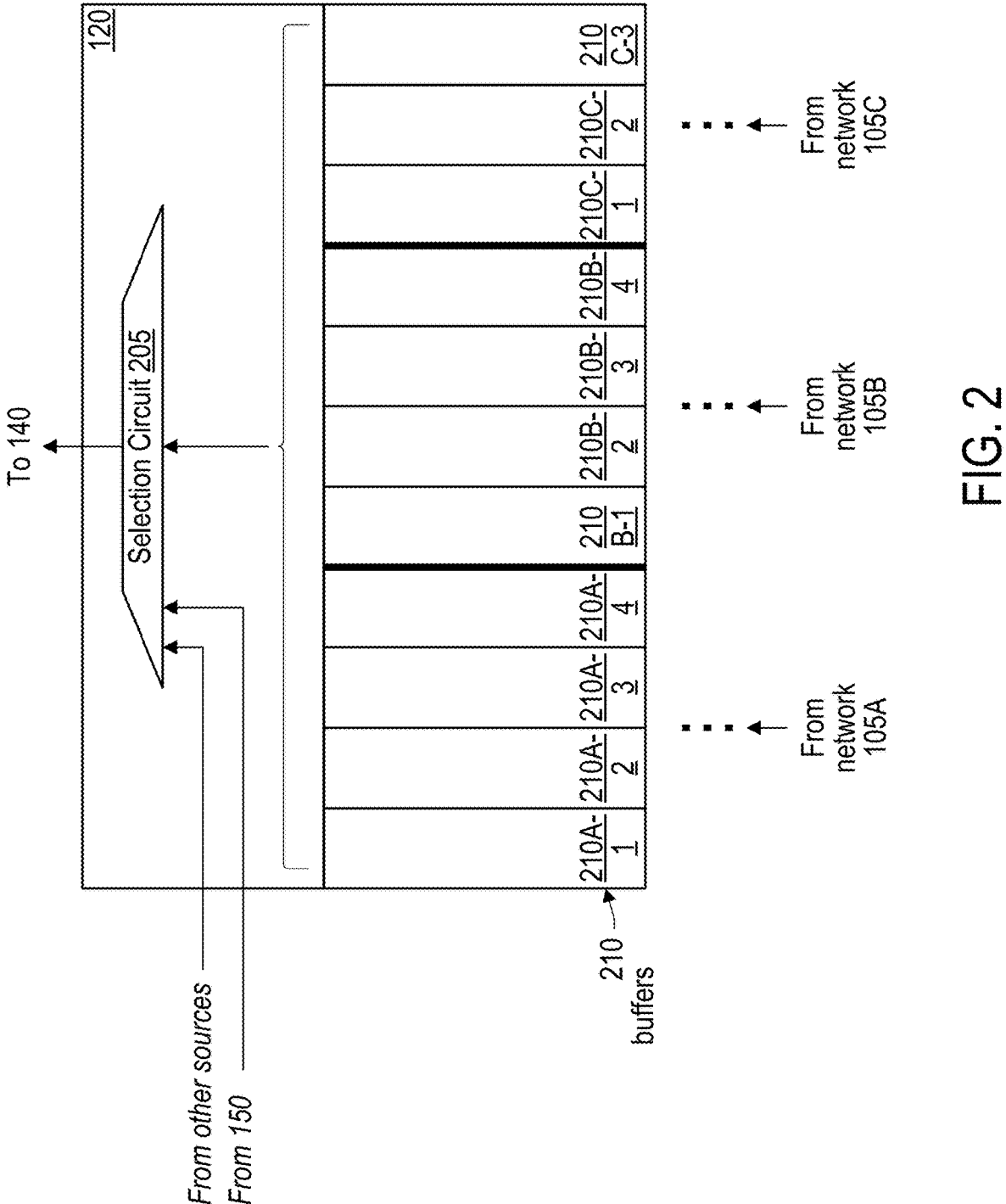
FIG. 2 is a block diagram of one embodiment of an arbitration circuit within a memory controller circuit.

FIG. 2 is a block diagram of one embodiment of arbitration circuit 120. As depicted, arbitration circuit 120 includes selection circuit 205 and a set of buffers 210 coupled to respective networks 105. Arbitration circuit 120, in the depicted embodiment, is an ingress queueing and arbitration point in an upstream memory path of computer system 100.

Arbitration circuit 120 includes a set of buffers 210, which may be skid buffers in one embodiment. In one embodiment, arbitration circuit 120 includes a dedicated buffer 210 for memory access requests from each virtual channel or sub-channel within each network 105. (The concept of virtual channels and sub-channels is explained below in the section entitled "Networks.") For example, buffers 210A-1 to 210A-4 are for virtual channels/sub-channels within network 105A, while buffers 210B and 210C are for virtual channels/sub-channels within networks 105B and 105C, respectively. The set of buffers 210 allows selection circuit 205 to select between multiple memory access requests for transmission to other portions of memory controller circuit 110. Buffers 210, in some embodiments, constitute intermediate queues located between the transport mechanisms of networks 105 and the global ordering point (GOP) of the memory sub-system, which refers to a point in the memory sub-system of a particular memory controller circuit 110. For the purposes of this disclosure, it is understood that when a memory access request crosses the GOP, that effect of the request is visible across the entire computer system. For example, a write that is allowed to cross the GOP is deemed to have updated the memory and has ensured that the coherent caches in the system do not contain stale data.

Selection circuit 205 is configured to select between memory access requests beyond those received from networks 105. In addition, selection circuit 205 is also configured to select from retried memory access requests received from retry queue circuit 150, as well as other potential sources, such as a snoop queue circuit (to be discussed further below) and memory cache circuit 130. In various embodiments, selection circuit 205 is configured to select a memory access request based on a variety of factors such as age, quality of service (QOS), and channel-based rules, and then issue the selected request to other portions of memory controller circuit 110. Note that each arbitration circuit 120 within a set of memory plane controller circuits 110 is configured to act independently.

In various embodiments, arbitration circuit 120 is configured to interface with memory cache circuit 130 in the upstream direction and may also be designed to maximize throughput and utilization of the memory sub-system bandwidth, while ensuring appropriate quality of service (QoS) and virtual channel separation. In one embodiment, arbitration circuit 120 may operate at a clock speed defined by one or more of networks 105. Buffers 210B and 210C may be fully synchronous to a clock speed for memory controller circuit 110.

Additionally, arbitration circuit 120, in the depicted embodiment, is configured to issue only those memory access requests for further processing by memory controller circuit 110 that have a reserved entry in retry queue circuit 150. In some embodiments, a network interface circuit in one of networks 105 may be configured to reserve an entry in retry queue circuit 150 before sending a memory access request for storage in one of buffers 210 of arbitration circuit 120. In other embodiments, arbitration circuit 120 may ensure that an entry in retry queue circuit 150 is reserved for a memory access request stored in a buffer 210 before that memory access request can be successfully selected. Arbitration circuit 120 is thus configured to select memory access request 102 for issuance 122 to tag pipeline circuit 140 as a result of an arbitration process and based on availability of entry 152 in retry queue circuit 150. Reservation of entry 152 guarantees that lack of availability of retry queue circuit 150 will not cause memory access request 102 to be returned to a network 105 for resubmission to arbitration circuit 120.

Figure 3A:
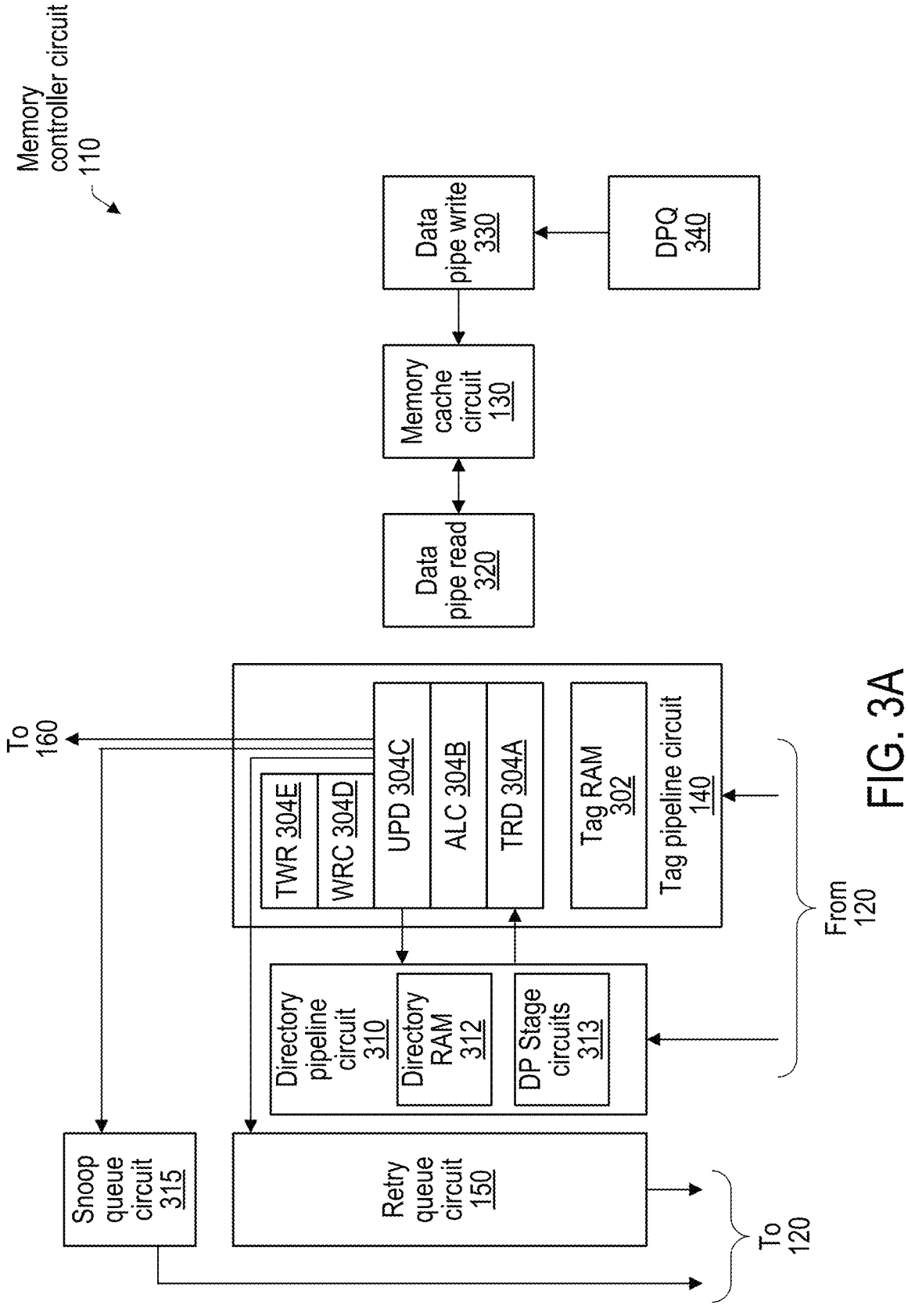
FIG. 3A is a block diagram of one embodiment of a memory controller circuit.

FIG. 3A is a block diagram of one embodiment of portions of memory controller circuit 110 other than arbitration circuit 120 previously described. As depicted, memory accesses requests selected by arbitration circuit 120 are concurrently issued to tag pipeline circuit 140 and directory pipeline circuit 310. Tag pipeline circuit 140 is configured to process the received memory access request and determine a destination for the request. These destinations include the interface for system memory 160, snoop queue circuit 315, and retry queue circuit 150. Also depicted in FIG. 3A is memory cache circuit 130, along with data pipe read circuit (DPRD) 320, data pipe write circuit (DPWR) 330, and data pipe queue (DPQ) circuit 340.

Directory pipeline circuit 310 includes directory pipeline stage circuits 313 that are configured to access a directory RAM 312 storing information indicating those addresses currently being handled by memory controller circuit 110. Thus, in scenarios in which memory controller circuit 110 is a memory plane controller circuit, it is associated with a subset of memory addresses mapped by address hashing to that particular memory plane. Collectively, all directory pipeline circuits 310 in computer system 100 maintain information on all cache lines held in various coherent agents in the system. These circuits 310 thus provide information necessary to manage coherence protocol and ensure data consistency across multiple coherent agents. Note that directory RAM 312 has a number of cache lines that is typically smaller than the total number of cache lines that are in memory cache circuit 130. Accordingly, a lookup in directory RAM 312 can produce a miss, which can lead to an eviction of an entry in that directory. Doing this may require a snoop from all the data that was cached in that cache block from anywhere in computer system 100.

As noted, when a memory access request is selected by arbitration circuit 120, it is concurrently issued to both directory pipeline circuit 310 and tag pipeline circuit 140. Tag pipeline circuit 140, in conjunction with directory pipeline circuit 310, provides an indication whether the memory access request has passed the GOP. Globally ordered requests may need to update tag, state and LRU fields of an entry in directory RAM 312, generate snoop request(s) to coherent agents within system 100 or initiate a directory RAM 312 victimization process if a new entry needs to be allocated in a fully populated directory RAM 312. A cache line snoop-lock mechanism (in snoop queue circuit 315) may facilitate serialization, if necessary, between accesses to the same cache line across different ones of networks 105.

Directory pipeline circuit 310 thus enforces cache coherency for memory access requests flowing through the memory subsystem of computer system 100. Circuit 310, by maintaining tag copies for the valid lines held by all coherent agents in the system and looking up tag and state information, can determine if any coherent agent has a cache line with a state such as Exclusive or Shared and manage coherency within the memory subsystem. For example, requests hitting in directory pipeline circuit 310 may trigger a snoop transaction to the relevant coherent agent to retrieve the cache line and forward the data to the requesting agent.

Tag pipeline circuit 140 and directory pipeline circuit 310 share aligned pipelines and may have aligned pipelines in one implementation. Tag pipeline circuit 140 depends on hit/miss information from directory pipeline circuit 310 to serialize memory access requests and maintain coherency. Directory pipeline circuit 310, in turn, depends upon the decision of tag pipeline circuit 140 as to whether a particular memory access request has passed the GOP to update directory pipeline circuit 310.

In one embodiment, tag pipeline circuit performs memory tag cache lookup and schedules processing for the memory access request based on factors such transaction type, the state of the memory cache line, availability resources, etc. Tag pipeline circuit 140 may also be responsible for memory cache management operations like flushing the cache. In one embodiment, tag pipeline circuit 140 is a multi-stage pipeline that performs actions such as looking up memory cache tag and state for all new memory access requests received from arbitration circuit 120; determining, based, on cache lookup results, further processing steps and reserving additional resources that may be needed for the request's handling; and updating memory cache tag, state, and other information such as least recently used (LRU) information. One possible implementation of a pipeline 304 for tag pipeline circuit 140 is shown in FIG. 3A. Directory pipeline stage circuits 313 in directory pipeline circuit 310 are not pictured in FIG. 3A for simplicity, but are similar to the stages of pipeline 304 in one embodiment.

In one embodiment, when a memory access request 102 is issued to tag pipeline circuit 140, arbitration circuit also initiates a read of tag RAM 302 and directory RAM 312, and initiates a lookup in snoop queue circuit 315.

In a first pipeline stage 304A (labeled as TRD, for tag read), tag information and raw hit information may be available from tag RAM 302. Directory tag information may also be available at this stage. Additionally, this stage may also perform a lookup in the retry queue circuit 150 for address conflicts. Other actions may include providing early bank/index information to DPRD 320 for possible read access in the event of a cache hit; and in the case of a cache eviction, selecting a replacement way.

In a second pipeline stage 304B (labeled as ALC), the selected way may be sent to data pipe read circuit 320. The selected way may be a memory cache hit way for reads or a cache replacement way for evictions, depending on the result of the tag read. This stage may also perform additional actions for command handling. This stage of the directory pipeline may receive tag information from tag pipeline circuit 140.

In a third pipeline stage 304C (labeled as UPD, for update), an access to system memory 160 may be considered to have passed the GOP in some embodiments. This information is communicated to the pipeline of directory pipeline circuit 310. This stage may also enqueue commands to other system resources such as DPQ circuit 340. Additionally, stage 304C may compute updates to tag RAM 302 and LRU information. By the conclusion of stage 304C, then, it can be determined whether memory access request 102 has generated a hit in snoop queue 315, needs to be retried (and thus sent to retry queue circuit 150), or is to be sent to system memory 160. These options are all indicated as potential outcomes of pipeline stage 304C.

Next, in pipeline stage 304D (labeled WRC), those commands destined for system memory may be sent to an appropriate buffer (not pictured). Additionally, tag RAM 302, directory RAM 312, and LRU writes may be initiated. Finally, in pipeline stage 304E (labeled TWR), tag RAM 302 and LRU writes take effect.

Retry queue circuit 150, as noted, is used to store information relating to memory access requests that are unable to complete a full pass through tag pipeline circuit 140. One possible reason for the inability of a memory access request to complete is cache line locking. In some implementations, memory controller circuit 110 may implement a special locking mechanism to enforce atomicity of coherent operations. When a cache line is marked as locked in such implementations, it cannot be written or evicted by other transactions. When a hit on a locked cache line occurs, tag pipeline circuit 140 sends that memory access request to retry queue circuit 150 and the request is later retried and can succeed when the line is no longer locked. Another potential use for retry queue circuit 150 is when a memory access request hits on a cache line in a data pending dirty state, meaning there is a pending fetch to system memory 160 that will be merged with partially dirty data currently present in memory cache circuit 130. Again, such a transaction can be enqueued in retry queue circuit 150 and retried when the pending fetch is complete.

Another use for retry queue circuit 150 is when some resource needed to complete the memory access request is unavailable. For example, if space in either read or write queues to system memory 160 is not available, the memory access request will be enqueued in retry queue circuit 150. Similarly, if downstream memory resources such as output transaction tables used to store data retrieved from system memory 160 or memory cache circuit 130 are unavailable, corresponding memory access requests will also be enqueued in retry queue circuit 150 for later completion.

More detail regarding retry queue circuit 150 is provided below with respect to FIG. 3B.

Snoop queue circuit 315 is used, in one embodiment, to track memory access requests that cause snoops and invalidations requests. Thus, if a memory access request passing through tag pipeline circuit 140 hits in directory pipeline circuit 310, there will be an attempt to obtain an entry in snoop queue circuit 315, which is required to pass GOP in one implementation. An allocated entry in snoop queue circuit 315 may be populated with various transaction attributes, which may indicate which responses need to be collected to respond to the snoop (e.g., which coherent agents responses are needed from). Once all responses have been collected, the memory access request becomes eligible for reissue to tag pipeline circuit 140 through arbitration circuit 120. In various embodiments, each entry in snoop queue circuit 315 may include a finite state machine (FSM) that tracks snoop progress throughout computer system 100.

Directory eviction occurs when a coherent memory access request misses in directory pipeline circuit 310 and needs to allocate a new entry when all ways in the associated set are already taken. One way is picked for replacement, and the line tracked by the selected directory entry (the directory victim) needs to be evicted. While the victimization is in progress, all subsequent requests to this address are stalled.

When a coherent transaction that has caused a directory eviction passes GOP, tag pipeline circuit 140 may allocate a new entry in snoop queue circuit 315, which may be initialized with the victim address and the list of snoop responses to be collected. When snoop queue circuit 315 receives all the expected snoop responses, the corresponding entry is either dequeued from the snoop queue circuit 315 or sent upstream to complete evicted data write-back. In the latter case, once the last pass of the transaction has passed GOP and the data has been pulled from the network interface (if needed), the transaction is dequeued from snoop queue circuit 315.

In various embodiments, those cache lines tracked by valid entries in snoop queue circuit 315 are considered locked. Every transaction going through tag pipeline circuit 140 thus performs an address lookup in snoop queue circuit 315. If a memory access request hits one of the pending addresses in circuit 315, it will not pass GOP, and will thus be enqueued to retry queue circuit 150. Such a request will then be retried from retry queue circuit 150 only after the coherent transaction (whether a snoop operation or a directory eviction) tracked by the snoop entry is completed and the line is unlocked.

FIG. 3A also illustrates, for the sake of completeness, memory cache circuit 130 and associated circuitry. Data pipe queue (DPQ) circuit 340, in one embodiment, receives information from tag pipeline circuit 140 in the event of a cache hit. If the memory access request is a read, it will be forwarded to the data pipe read circuit (DPRD) 320, and if the memory access request is a write, it will be forwarded to data pipe write circuit (DPWR) 330. In some cases, a particular memory access request may be directed to both DPRD 320 and DPWR 330 if a read-modify-write-type transaction is involved, which may necessitate multiple passes through the data pipe.

Figure 3B:
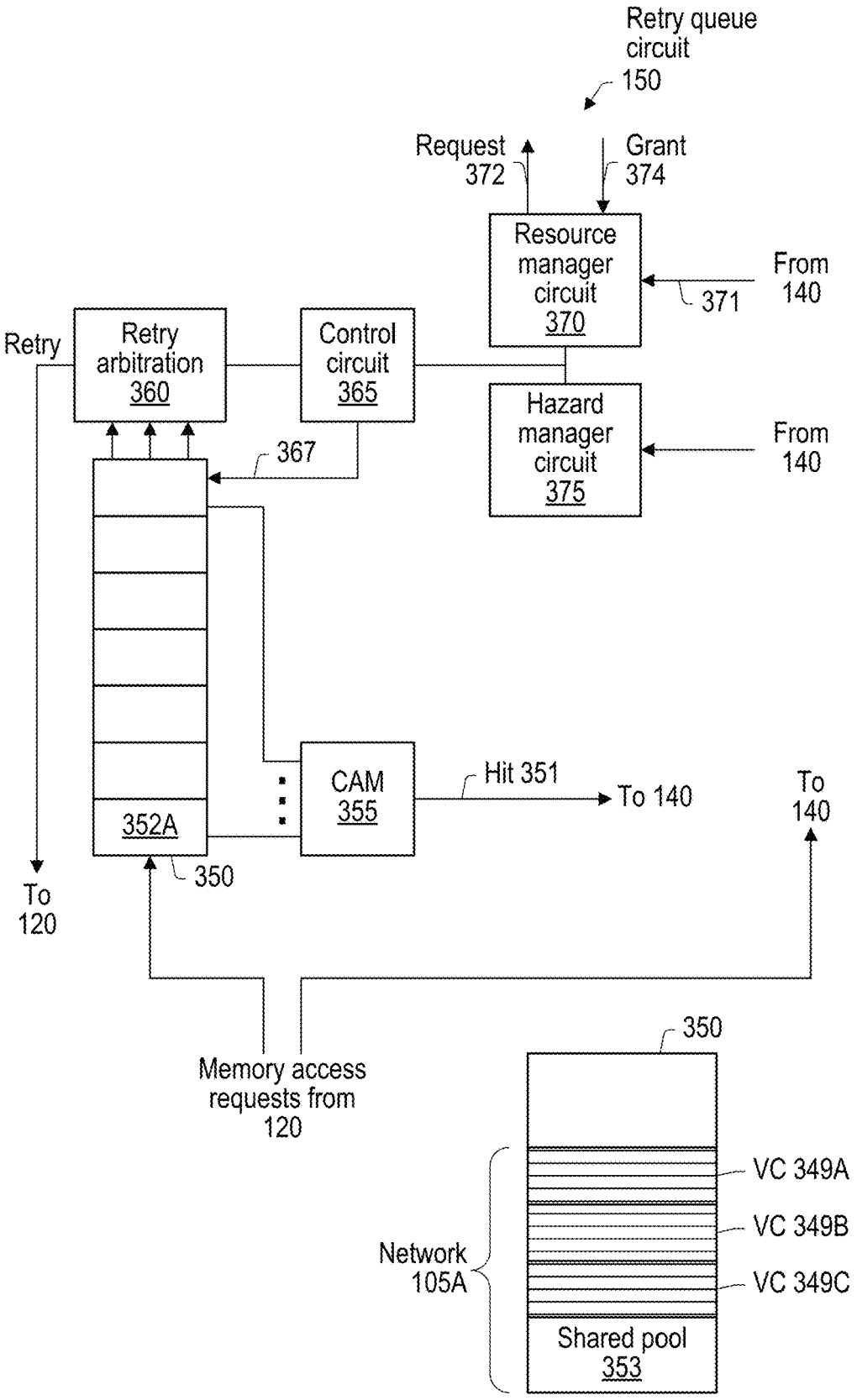
FIG. 3B is a block diagram of one embodiment of a retry queue circuit within a memory controller circuit.

FIG. 3B is a block diagram of one embodiment of retry queue circuit 150. As noted, retry queue circuit 150 is a transaction processing queue that is responsible for storing memory access requests that could not be completed on an initial pass through tag pipeline circuit 140. In the depicted embodiment, retry queue circuit 150 includes queue circuit 350 (which includes entries 352) content addressable memory (CAM) circuit 355, retry arbitration circuit 360, control circuit 365, resource manager circuit 370, and hazard manager circuit 375. While one specific retry queue circuit embodiment is depicted in FIG. 3B, it is to be understood that the phrase "retry queue circuit" encompasses any circuitry that is used to store memory access requests to a memory subsystem that cannot be completed upon an initial pipeline pass.

Queue circuit 350 stores information relating to memory access requests that need to be retried. One potential organization of entries 352 within queue circuit 350 is discussed below. Entries 352 may be reserved by arbitration circuit 120 using, for example, credit reservations 351 for each memory access request issued to tag pipeline circuit 140. Once a particular memory access request is determined to pass GOP (a determination which can be made by control circuit 365 based on available inputs), pre-allocated entry 352 may be released via interface 367. In implementations in which retry queue circuit 150 and arbitration circuit 120 (the entity requesting credits from RHQ 150) are physically near one another on an integrated circuit (IC) die, credits for queue circuit 350 may be able to be requested and released within a few clock cycles. This arrangement may advantageously permit retry queue circuit 150 to be implemented using relatively fewer entries.

Two potential conditions that can cause a memory access request to fail to pass GOP are insufficient resources and an address hazard. These conditions may be managed by resource manager circuit 370 and hazard manager circuit 375, respectively, in some embodiments. An address hazard may occur for example, when a memory access request traveling through tag pipeline circuit 140 hits on an entry in snoop queue circuit 315 or when there is a lock on a particular cache line. An insufficient resource condition may occur when some resource (e.g., a read or write memory queue, an output transaction table, etc.) is unavailable. Transaction information 371 from tag pipeline circuit 140 can indicate information regarding the type of a current memory access request in tag pipeline circuit 140. Resource manager circuit 370 can then interrogate the relevant system resources that needed to be reserved for that request type via request interface(s) 372, and receive grant (or denial) information via interface(s) 374.

Results from resource manager circuit 370 and hazard manager circuit 375 are then communicated to control circuit 365, which may include a finite state machine (FSM) in one implementation. Control circuit 365, as noted, can either release credit for an entry 352 if the request passes GOP, or continue to allow the request to remain in queue 350 if the request does not pass GOP. Control circuit 365 may be configured to track, along with circuits 370 and 375, the conditions that led to a request being enqueued in queue 350. When such conditions resolve, control circuit 365 may mark such transactions via interface 367, such that they are now eligible to be retried.

Retry arbitration circuit 360, in one embodiment, is configured to arbitrate between those requests enqueued in queue 350 that have been indicated as eligible for being retried. A request selected by retry arbitration circuit is sent to arbitration circuit 120, where it can be selected for simultaneous reissue to tag pipeline circuit 140 and directory pipeline circuit 310. CAM lookup circuit 355 is configured to communicate to tag pipeline circuit 140, via hit signal 351, whether a particular current memory access request traveling through the tag pipe is already present in queue 350. In one implementation, queue circuit 350 creates a linked list of "same address requests" to enable serial processing of these queues. In response to a hit by CAM lookup circuit 355 for a memory request traveling through tag pipeline circuit 140, the request will chain that memory request behind those for the same address that already extant in queue circuit 350.

FIG. 3B also shows an implementation of queue circuit 350 in which there is dedicated storage for entries originating from each network 105 (a set of dedicated entries for network 105A is shown, for example). Additionally, queue circuit 350 includes a set of entries 349 dedicated to each virtual channel within a particular network (e.g., 349A-C). Still further, to prevent congestion, queue circuit 350 may also include a shared pool of entries 353 available to any virtual channel for a given network. In some implementations, there may be dedicated entries for sub-channels of a particular virtual channel as well.

In the depicted implementation, however, there is no sharing of entries for different networks within queue circuit 350. This arrangement allows for example, processor traffic from one network that keeps hitting in memory cache circuit 130 to progress even when traffic from another network is stalled due to no entries being available in queue circuit 350 for that network.

FIG. 3B thus depicts a retry queue circuit (150). The retry queue circuit is configured to store access request information in a particular entry (352) relating to the memory access request in response to a tag pipeline circuit (140) determining that the memory access request requires another pass through the tag pipeline circuit. The retry queue circuit is further configured to subsequently send the stored access request information to an arbitration circuit (120) for reissuance of the memory access request. The tag pipeline circuit may be configured to determine that the memory access request requires another tag pipeline pass in response to a determination that some particular storage resource (e.g., snoop queue circuit 315, discussed next) required to complete the memory access request is not currently available.

Figure 3C:
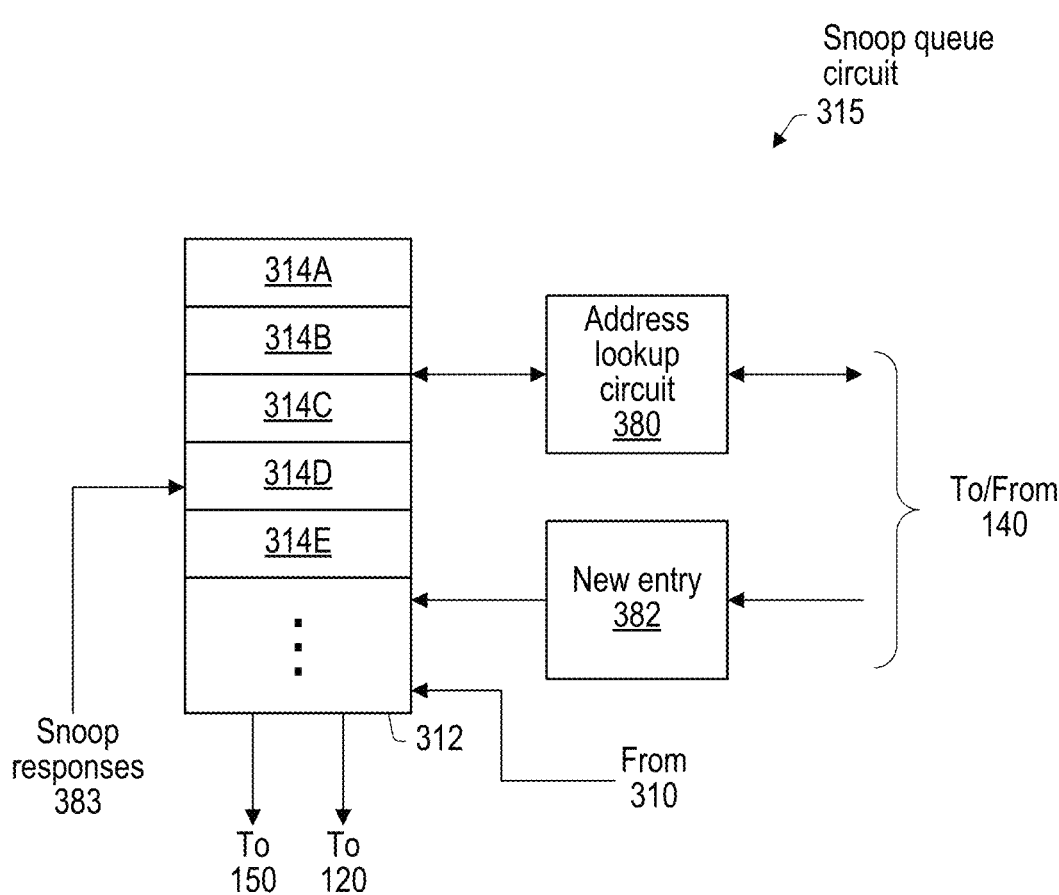
FIG. 3C is a block diagram of one embodiment of a snoop queue circuit within a memory controller circuit.

FIG. 3C is a block diagram of one embodiment of snoop queue circuit 315. As is understood in the art, snooping refers to a set of actions taken to maintain consistency between different agent circuits that are attempting to access a common portion of system memory via accesses to different cache memory circuits. Snooping involves broadcasting messages to other agent circuits within computer system 100 to notify them of the access, as well as receiving response messages from such agent circuits. Snoop queue circuit 315, as will be described, is configured to store information for snoop requests issued by memory controller circuit 110 that are awaiting snoop responses from other agent circuits within computer system 100.

In some embodiments, the coherence protocol of computer system 100 may support various types of snoops, including three-hop (3-hop) and four-hop (4-hop) snoops. Three-hop snoops may be used in those scenarios involving cacheable read requests by a processor agent circuit, where any agent circuits within the computer system that do not support caching (which may be referred to as I/O agent circuits, or IOA circuits) do not need to be snooped. Four-hop snoops, on the other hand, are used for 1) cacheable requests from processor agent circuits which do need to snoop IOA circuits and 2) noncacheable read and write requests from any type of agent circuit (e.g., processor agent circuit, GPU agent circuit, SoC agent circuit).

In a 3-hop snoop, the following "hops" occur: 1) a snoop request for a memory location is sent to memory controller circuit 110; 2) a snoop message is sent to the agent circuits that may possess copies of the memory location; and 3) a response message to the requesting agent circuit is sent to the snooped agent. Note that in a 3-hop snoop, once memory controller circuit 110 has sent the snoop message, it does not need to be involved further. Accordingly, there is no need to further track 3-hop snoops as far as transactions that may be potentially retried. This can be the case, for example when 3-hop snoops are limited to certain types of transactions, such as cacheable read requests when certain agent circuits that do not support caching do not need to be snooped.

On the other hand, in a 4-hop snoop, the following hops occur: 1) a snoop request is sent to memory controller circuit 110 by a requesting agent circuit; 2) a snoop message is sent to the circuit that has the requested data; 3) the requested data is sent to memory controller circuit 110; and 4) data is provided to the requesting agent circuit. Consider one potential scenario for a 4-hop snoop: a snoop request for a particular memory location is issued, and a portion of the referenced cache line is dirty. The requesting agent circuit is not configured to handle the dirty data (e.g., because it does not implement caching functionality). Accordingly, the extra hop in a 4-hop snoop relative to a 3-hop version involves sending the data to memory controller circuit 110. Circuit 110 is configured to deal with the dirty data, such as by writing it to system memory 160 and providing the requested portion of the data to the requesting entity.

Snoop queue circuit 315, in the depicted embodiment, is configured to track 4-hop, but not 3-hop snoops. Three-hop snoops are not tracked within snoop queue circuit 315 in this embodiment because memory controller circuit 110 does not need to be involved further after sending the snoop message. For 4-hop snoops, however, snoop responses are tracked by circuit 315 within the context of a potential retry because a memory access request that hits on the address for which a 4-hop snoop is active needs to be held off until all snoop responses are received. Accordingly, keeping track of snoops in snoop queue circuit 315 permits a memory access request to an address affected by a pending 4-hop snoop to be delayed until such time as all snoop responses are received and the snoop completes.

Snoop queue circuit 315 also tracks invalidations from directory pipeline circuit 310. These invalidations occur when a new entry in directory pipeline circuit 310 is needed but there is not room in the cache set that is associated with the relevant cache line. Thus, in various embodiments, all transactions that 1) hit in directory pipeline circuit 310 and generate 4-hop snoops or 2) transactions that cause directory eviction must pass through snoop queue circuit 315 to pass GOP.

As depicted, snoop queue circuit 315 includes snoop queue circuit 315, which includes entries 314. Snoop queue circuit 315 also includes new entry circuit 382 and address lookup circuit 380. In one embodiment, snoop queue circuit 315 is of a fixed size (which may differ per implementation, based on desired QoS and snoop bandwidth) and supports a configurable number of entries that are reserved for evictions triggered by certain types of high-priority transactions, allowing such transactions to achieve forward progress when snoop queue circuit 315 is full of lower-priority victims.

When tag pipeline circuit 140 determines, in conjunction with directory pipeline circuit 310, that a memory access request requires snoop response tracking, this information is communicated to new entry circuit 382, which allocates a new entry 314. In one embodiment, each entry 314 implements an FSM that tracks snoop transaction progress. This new entry 314 may be populated using information from directory pipeline circuit 310 in some implementations. For example, entry 314 may be populated with transaction attributes that indicate which responses need to be collected (e.g., copy back responses, acknowledgement responses) for 4-hop snoops. Note that if no entries are available, the memory access request may be sent to retry queue circuit 150 in one embodiment, where it may remain until snoop queue entries 314 are available.

Address lookup circuit 380 is configured to interact with tag pipeline circuit 140 to determine if a particular memory access request corresponds to a pending snoop. Circuit 380 may thus be configured to receive addresses of current memory access requests in tag pipeline circuit 140. If address lookup circuit 380 indicates a match, that information can be provided to tag pipeline circuit 140, which may be configured to place the corresponding memory address request in retry queue circuit 150. If address lookup circuit 380 does not indicate a match, the memory access request will not need to be retried due to a hit in snoop queue circuit 315 (although other factors unrelated to a snoop may necessitate a retry).

In the depicted embodiment, after a new entry 314 is created by new entry circuit 382, snoop queue circuit 315 is configured to begin receiving snoop responses 383. A given snoop response will indicate a particular one of entries 314 to update. As noted, a given entry 314 may include an FSM that indicates which snoop responses need to be received in order for the snoop to be declared complete. A given snoop response will update the FSM for the selected entry. Once all snoop responses indicated by the given entry have been received, the memory access request corresponding to the given entry become eligible to be reissued to arbitration circuit 120. Information indicating snoop completion may also be conveyed to retry queue circuit 150, which can indicate to FSMs in queue circuit 350 that a memory access request that has blocked on the just-completed snoop may now be retried (e.g., reissued to arbitration circuit 120).

All cache lines tracked by valid entries 314 are considered locked in some embodiments. In such instances, each transaction going through the tag pipeline circuit 140 performs address lookup in snoop queue circuit 315. If a current memory access requests hits one of the pending addresses in entries 314, it will not pass GOP and will be enqueued to retry queue circuit 150. This memory access request, in some embodiments, is retried from retry queue circuit 150 only after the coherent transaction (4-hop snoop operation or directory eviction) that is being tracked by entry 314 is completed and the line is unlocked.

Snoop responses 383 include information not only for snoops but also evictions from directory pipeline circuit 310. As noted, directory pipeline circuit 310 does not always have sufficient associativity to track all caching agent circuits in computer system 110. It is therefore possible for directory pipeline circuit 310 to have an eviction when an agent is bringing in a new line for tracking. If directory pipeline circuit 310 encounters a lack of available slots in the set associated with this line, it frees up one of the currently occupied slots by removing another line in the set from directory pipeline circuit 310 and forcing eviction of this line from the coherent cache (or multiple coherent caches, in the cache of line sharing) of the relevant agent circuits.

To mitigate capacity evictions, directory pipeline circuit 310 may be oversized: if the combined LLC capacity across the system is N cache lines, the aggregate directory may be sized to track k*N lines where, as a rule-of-thumb, where the scaling factor k is chosen in the range between 1.5-2.

Accordingly, when a coherent transaction that has caused an eviction in directory circuit passes GOP, tag pipeline circuit 140 allocates a new entry 314 in snoop queue circuit 315, which is initialized in one embodiment with the directory victim address and the list of snoop responses to be collected. While the victimization of an address is in progress, all subsequent requests to this address will typically be stalled. When snoop queue circuit 315 receives all the expected snoop responses, the corresponding entry is either dequeued from snoop queue circuit 315 (in case of a victim address eviction that only caused invalidations), or sent upstream to complete evicted data write-back. Once the last pass of the memory access request has passed GOP and the data has been retrieved (if needed), the memory access request is dequeued from the snoop queue circuit 315.

The snoop queue implementation described with respect to FIG. 3C improves upon a prior implementation in which a memory access request dispatched to tag pipe circuit 140 remains in a buffer external to memory controller circuit 110 until that request passes GOP. If the outcome of the memory access request is that a snoop is needed, a command in the prior implementation would remain in the external buffer until the snoop is sent out, responses are received, and the snoop response is thus completed. In the implementation depicted in FIG. 3C, on the other hand, once a memory access request is received by arbitration circuit 120 within memory controller circuit 110, that request remains within memory controller circuit 110 even if tag pipeline circuit 140 determines that a snoop is needed. One advantage of this approach is that snoop entries 314 only need to be allocated when a snoop is actually needed, in contrast to the prior implementation in which every entry in the buffer external to the memory controller would have to have storage allocated to handle a potential snoop. In another implementation, snoop queue circuit 315 could be implemented within retry queue circuit 150. But the present inventors have realized that it may not be necessary for every entry in queue circuit 350 to include support for snoop tracking. As one example, retry queue circuit 150 might include on the order of 60 to 70 entries, while snoop queue circuit might include on the order of 10 to 12 entries. Use of separate retry and snoop queue circuits as depicted in FIGS. 3B-C can thus lead to a more compact and efficient implementation.

To recap, FIG. 3C describes an apparatus in which the memory controller circuit includes a snoop queue circuit (315) configured to store information for memory access requests that require snoop commands. In response to completion of information being collected for a snoop command for the memory access request, the snoop queue circuit is configured to reissue the memory access request to an arbitration circuit (120). This figure describes that a tag pipeline circuit (140) may be configured to determine that a particular memory access request requires another pass through the tag pipeline circuit in response to 1) performing an address lookup for the particular memory access request against entries in the snoop queue circuit and 2) determining that an address hit exists for a particular snoop queue entry. A retry queue circuit (150) is configured to reissue the particular memory access request to the arbitration circuit in response to completion of a snoop command for the particular snoop queue entry.

Another potential feature of computer system 100 relates to management of half cache lines. As its name suggests, a half cache line (HCL) is half of a cache line supported by a given computer system. To make HCLs useful, computer system 100 may maintain status bits (in particular, dirty bits) for each HCL. Consider a 128-byte cache line: this line can be split into two 64-byte cache lines, with each HCL having its own set of status bits. A memory controller circuit such as circuit 110, having separate dirty bits for two halves of a particular cache line, may thus be able, in some situations, to write only the dirty half of a cache line to system memory 160, thus saving memory bandwidth.

Computer system 100 may include multiple cache structures. Memory controller circuit 110 has memory cache circuit 130, while processor agent circuits may each have one or more lower-level caches relative to the one in memory cache circuit 130. In prior implementations, versions of memory controller circuit 110 supported marking only one half of a given cache line as dirty and only writing the dirty half back to system memory. But half cache lines were not supported in the lower-level caches within processor agent circuits in these implementations.

Accordingly, in these prior implementations, when a processor agent circuit would return a cache line to memory controller circuit 110, this status bits (in particular the dirty bit) would only be set at the granularity of the full line, even if only one half of that line was actually dirty. The only status information available to memory controller circuit 110 would thus indicate that the entire line was either clean or dirty. Thus a scenario could exist in which an entire cache line is marked as dirty by a processor agent circuit, even though one half of the cache line is actually dirty. In such a case, the prior memory controller circuit implementation would treat both halves as dirty even when this not actually the case. In this manner, HCL granularity is lost.

Figure 3D:
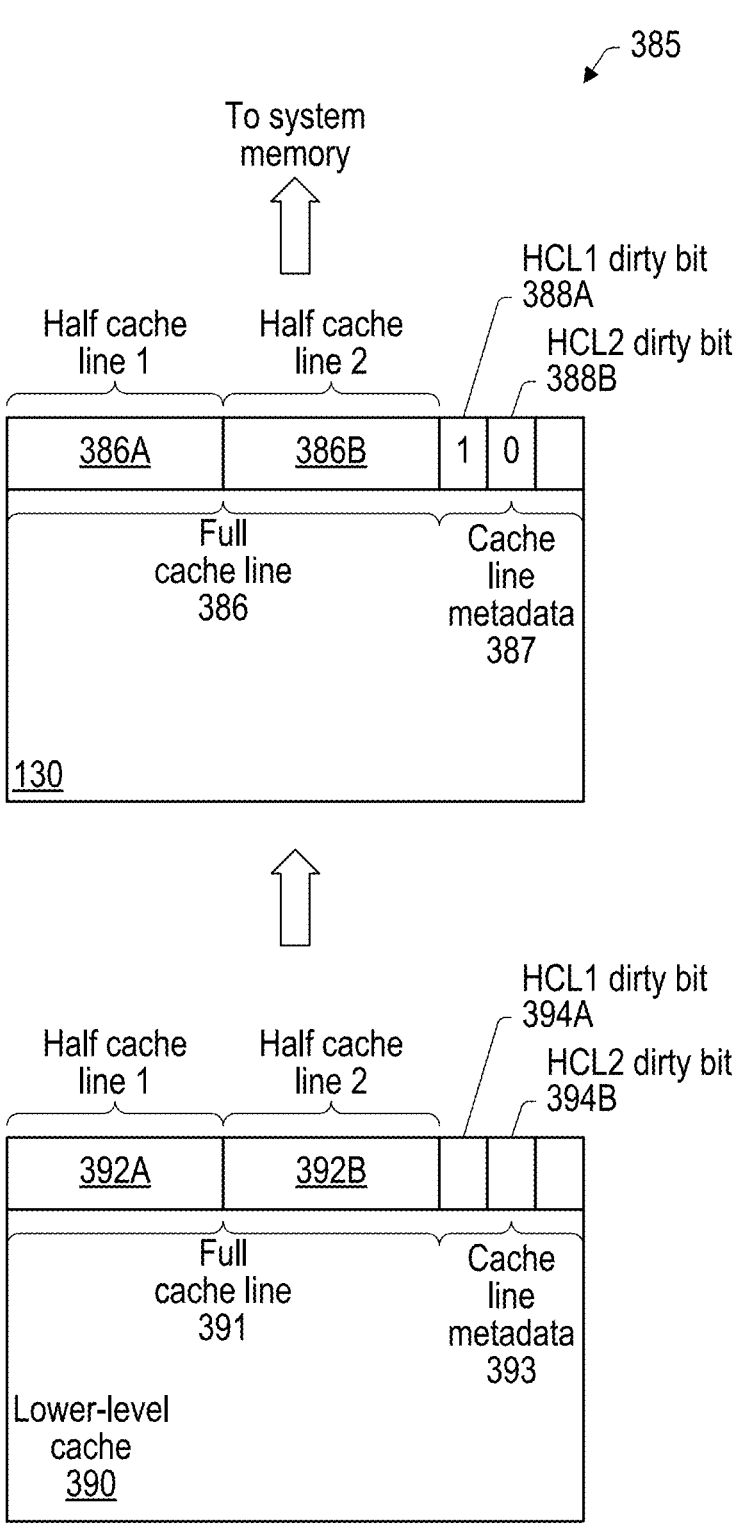
FIG. 3D is a block diagram illustrating support for dirty bits of half cache lines in one embodiment of a computer system with a hierarchy of caches.

FIG. 3D depicts an embodiment in which HCL granularity is implemented at processor agent circuits in a manner that flows to memory controller circuit 110. As shown, memory hierarchy 385 includes a lower-level cache 390 within a processor circuit agent and memory cache circuit 130. Lower-level cache 390 includes a full cache line 391 with constituent HCL 1 (392A) and HCL 2 (392B), as well as cache line metadata 393 with corresponding dirty bits 394A and 394B. Similarly, memory cache circuit 130 includes full cache line 386, which in this example is configured to store the full cache line 391. Full cache line 386 includes HCL 1 (386A) and HCL 2 (386B), as well as cache line metadata 387 with corresponding dirty bits 388A and 388B.

In this embodiment, because lower-level cache 390 now tracks dirty bits at HCL granularity, when full cache line 391 is written to higher-level cache memory cache circuit 130, cache line metadata 393 is also conveyed. Accordingly, dirty bits 394A-B associated with full cache line 391 can be written to dirty bits 388A-B associated with full cache line 386. In this manner, when memory cache circuit 130 needs to evict full cache line 386, HCL dirty bits 388A-B can be used to indicate whether only one half of full cache line 386 needs to be written to system memory 160. In this manner, HCL granularity is preserved from lower-level cache 320 through memory cache circuit 130 up through system memory 160. Thus, when a processor agent circuit writes to only a portion of full cache line 391, the HCL that is updated can have its dirty bit conveyed to memory cache circuit 130.

Accordingly, FIG. 3D depicts a processor circuit within computer system that includes a lower-level memory cache circuit (390) relative to the memory cache circuit (130) of the memory controller circuit, the lower-level memory cache circuit being configured to store cache lines (e.g., 391) having separate dirty indications of whether half cache lines within a given cache line are dirty (394A-B). In response to the memory controller circuit receiving a particular cache line from the lower-level memory cache circuit that has a first dirty indication for a first half of the particular cache line and a second dirty indication for a second half of the particular cache line, the memory controller circuit is configured to store the particular cache line (e.g., in 386), along with the first dirty indication and the second dirty indication, in the memory cache circuit (in 388A and 388B, respectively). Accordingly, when the particular cache line is evicted from the memory cache circuit, only half-cache lines indicated as dirty by the first and second dirty indications need to be written to system memory.

Memory access request 102 is depicted in FIG. 1A as being received from a network such as network 105. In various embodiments, a memory access request 102 directed to memory controller circuit 110 is directed over network 105 to a network interface (NI) circuit. In some cases, the NI may be specifically designed to handle traffic for memory controller circuit 110.

Figure 4A:
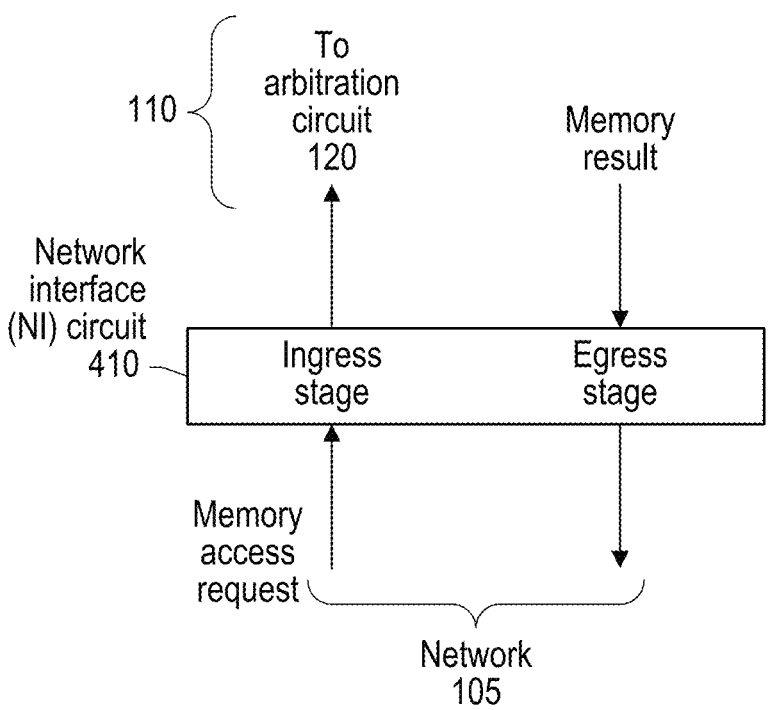
FIG. 4A is a block diagram illustrating one embodiment of a network interface circuit coupled between a network and a memory controller circuit.

FIG. 4A is a high-level block diagram of one embodiment of a NI circuit 410. As shown, NI circuit 410 is situated between network 105 and memory controller circuit 110. (Alternatively, NI circuit 410 can be considered to be a part of network 105.) NI circuit 410 has an ingress (or input) stage and an egress (or output) stage. The ingress stage, one embodiment of which is shown in more detail in FIG. 5A, receives a memory access request and provides it to arbitration circuit 120. The egress stage, one embodiment of which is shown in more detail in FIG. 5B, receives a memory result from memory controller circuit 110 and provides it to network 105.

As described at the beginning of this disclosure, one organization of a memory controller circuit pipeline in a previous implementation (e.g., using CTTs) was found to increase latency, area, and power consumption. In various embodiments described with respect to FIGS. 1-6 of the present disclosure, however memory controller circuit 110 has been architected to move the function of CTTs to a combination of buffers in NI circuit 410 and retry queue circuit 150. Arbitration circuits have been moved from the prior non-plane circuit into each memory plane controller circuit. Completion buffers have also been moved to NI circuit 410 as will be described below.

Figure 4B:
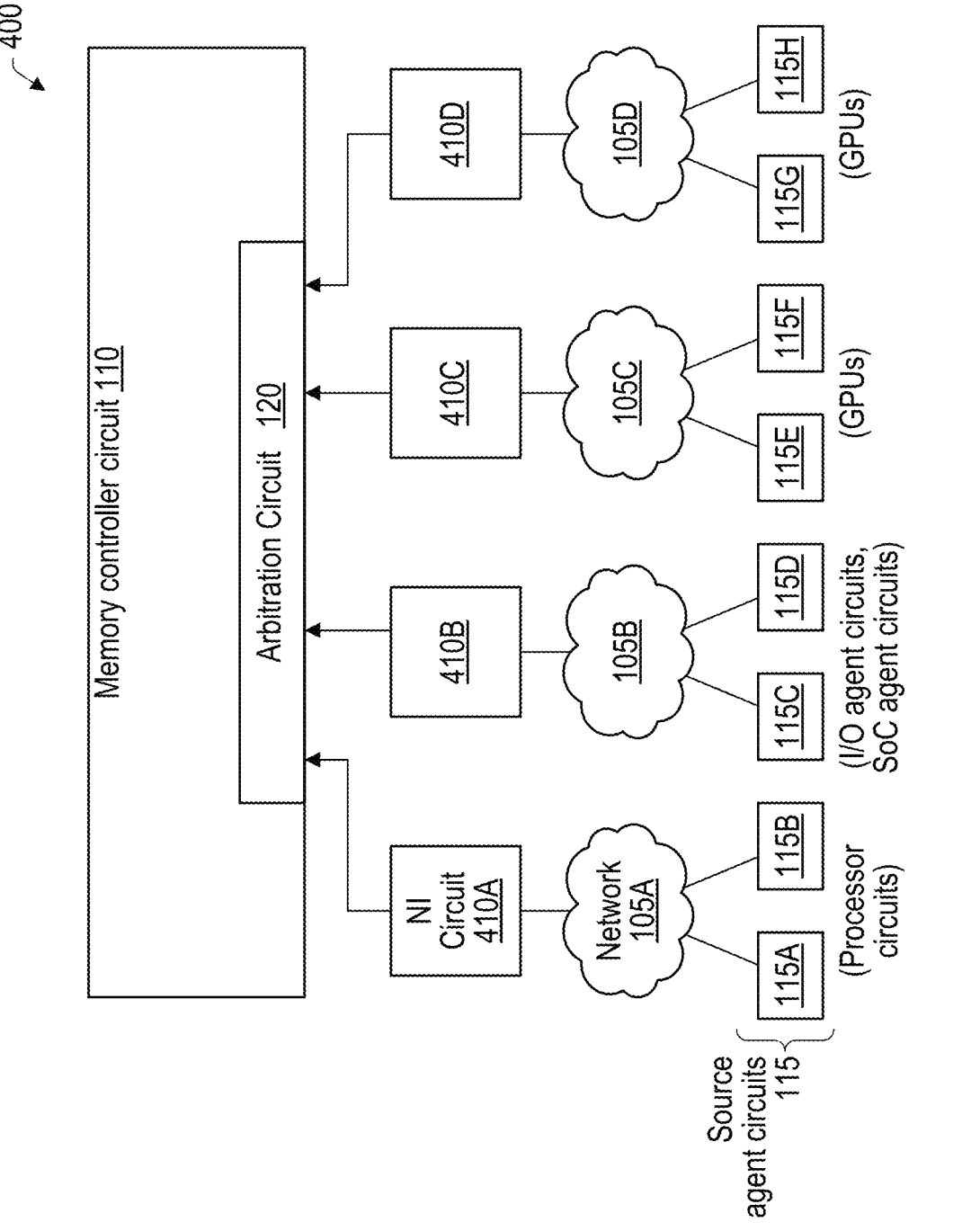
FIG. 4B is a block diagram illustrating one embodiment of a computer system in which a memory controller circuit is coupled to multiple networks via respective network interface circuits.

Thus, the prior implementation looked structurally like one NI circuit connected to one common non-plane circuit, which in turn was coupled to multiple memory controller circuits—one for each plane. In the approach disclosed in the present application, a given memory controller circuit is now directly connected to multiple NIs—one for each network. This arrangement is illustrated in FIG. 4B.

As shown, computer system 400 includes memory controller circuit 110, which includes arbitration circuit 120. Arbitration circuit 120, in turn, is coupled to four different networks 105A-D. In this embodiment, network 105A is a processor network, network 105B is an I/O network, and networks 105C-D are graphics networks. FIG. 4B also illustrates the variety of source agent circuits that can initiate memory access requests: processor circuits 115A-B, I/O agent circuits and SoC agent circuits 115C-D, and GPUs 115E-H.

Arbitration circuit 120 is thus configured to process those memory access requests received from various networks 105A-D that are destined for the portion of memory corresponding to memory controller circuit 110. Each set of requests from a particular network 105 passes through a respective NI 410. As previously shown, arbitration circuit 120 is configured to arbitrate between these requests on a given clock cycle. The architecture proposed by the present disclosure is a structure in which a single memory controller circuit is configured to receive requests from multiple networks without first passing through a common, non-plane circuit as in previous implementations.

Figure 4C:
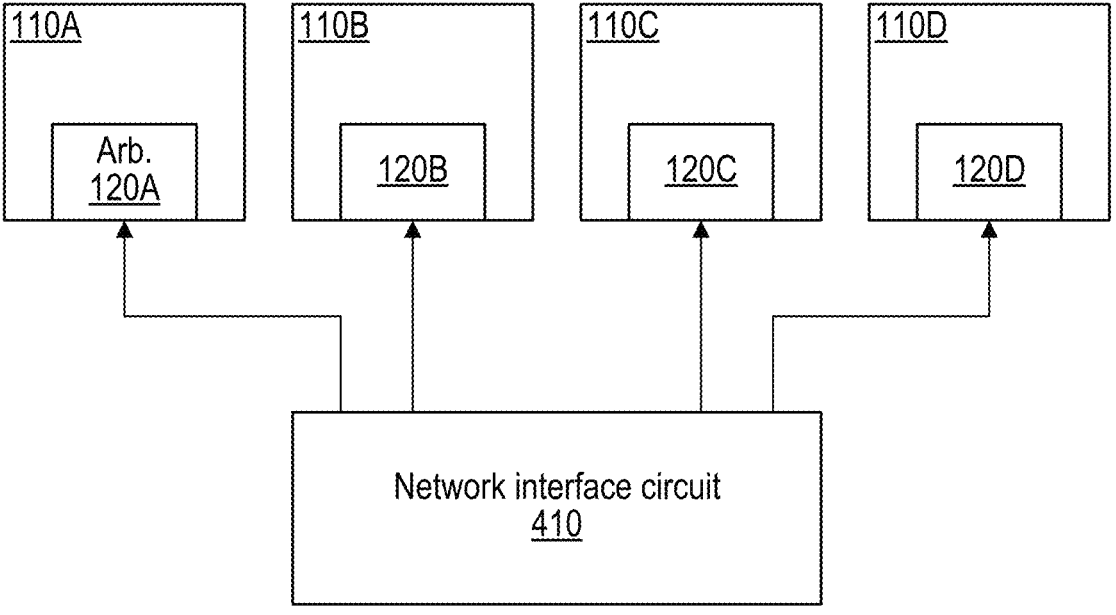
FIG. 4C is a block diagram illustrating one embodiment of a computer system in which a network interface circuit is coupled to multiple memory plane controller circuits.

FIG. 4C depicts the use of multiple memory plane controller circuits, indicated by reference numerals 110A-D. As shown, a single NI circuit 410 may now be connected to multiple memory controller circuits. FIG. 4C thus illustrates multiple independent memory controllers connected to a single NI. Thus, FIGS. 4B-C taken together disclose that a single memory controller circuit can receive inputs from corresponding NI circuits of multiple system networks, and that a given NI circuit can be connected to multiple memory plane controller circuits. What looked like one NI circuit connected to one common area of memory cache (which was further coupled to multiple memory cache planes) in a prior implementation has now been reduced to one NI that is connected to multiple memory planes. This architecture also allows multiple independent memory plane controllers to be connected to a single NI circuit. This arrangement advantageously reduces unnecessary data movement and conserves system power.

Generally speaking, each of memory plane controller circuits 110A-D will be coupled to a corresponding portion of volatile memory (DRAM). But in some cases, it may be desirable to reuse memory plane controller circuits 110A-D in distinct configurations that require differing amounts of volatile memory, which can be a significant component of system cost. For example, the same integrated circuit or circuits may be used in a number of different computing platforms (e.g., wearable, phone, tablet, laptop, desktop). One of more of these implementations may have differing amounts of volatile memory. Scenarios in which not all memory plane controller circuits are coupled to volatile memory can be referred to as "partially populated" DRAM configurations. Under such configurations, volatile memory is coupled to some, but not all, of the plurality of memory plane controller circuits. The system that includes the partially populated DRAM further includes a selection circuit coupled to the plurality of memory plane controller circuits. The selection circuit is configured to select, in response to a memory access request, from between those ones of the plurality of memory plane controller circuits to which volatile memory is actually coupled in order to handle the memory access request (and not from between memory plane controller circuits to which volatile memory is not coupled).

For example, DRAM might be coupled to memory plane controller circuits 110A-B, but not circuits 110C-D. In such an implementation, a single bit in a memory address might be used to select between memory plane controller circuits 110A-B. In another implementation, DRAM might be coupled to memory plane controller circuit 110A, but not circuits 110B-D. In that implementation, the selection circuit would always select memory plane controller circuit 110A. In yet another implementation, DRAM might be coupled to memory plane controller circuits 110A-C, but not circuit 110D. In that implementation, techniques for hashing to a non-power-of-two number of destinations (such as those disclosed in U.S. application Ser. No. 18/296,861, entitled "Routing Circuit for Computer Resource Topology," which is hereby incorporated by reference in its entirety) may be employed.

Figure 5A:
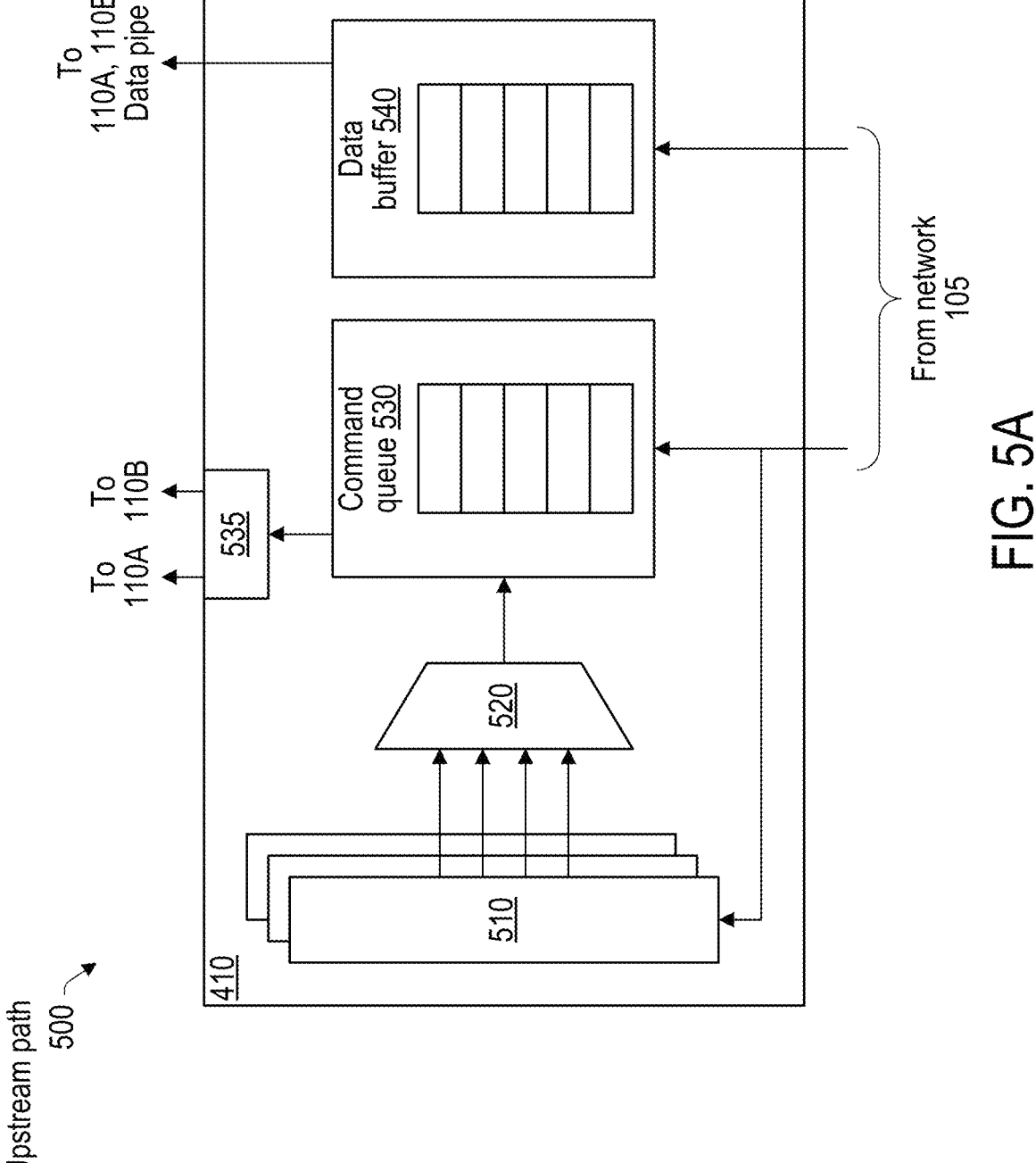
FIG. 5A is a block diagram of one embodiment of an upstream path of a network interface circuit.
Figure 5B:
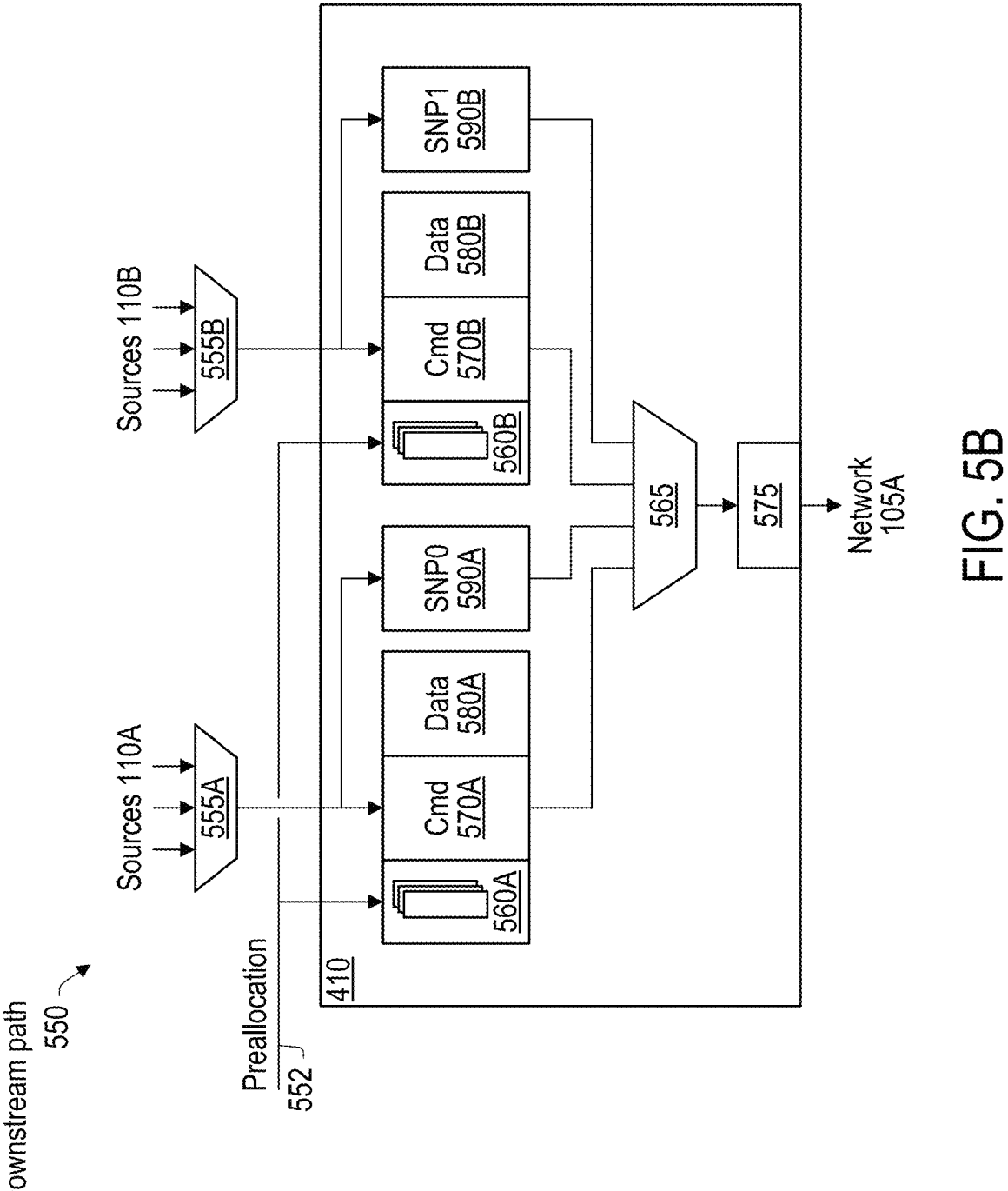
FIG. 5B is a block diagram of one embodiment of a downstream path of a network interface circuit.

Before proceeding to FIGS. 5A-B, which will be used to describe the constituent portions of one embodiment of NI circuit 410, the following paragraphs provide additional details regarding agent circuits 115, networks 105, and credit schemes that can be used to prevent deadlock over such networks.

Agent Circuits

Agent circuits 115 are circuits that implement functionality for agents within computer system 100. As used herein, an agent is any component or device (e.g., processor, peripheral, memory controller, etc.) that sources and/or sinks communications on one or more of networks 105. A source agent circuit generates (sources) a communication, and a destination agent circuit receives (sinks) the communication. A given agent circuit 115 may be a source agent for some communications and a destination agent for other communications.

As used herein, a "processor circuit" refers to any type of central processing unit (CPU). A given processor circuit (e.g., 115A or 115B) can include multiple CPUs. For example, one implementation might include a single component with one processing element (i.e., one processor core). Another implementation might include a single component with multiple processor cores. Yet another implementation might include a processor cluster with multiple components, each of which may include multiple processor cores.

"Memory controllers," on the other hand refer to any circuit that interfaces to system memory, which includes DRAM. Some embodiments of memory controllers may include memory caches, while others may not. Agent circuits 115A-B, for example, are able to access memory controller circuit 110 using network 105A.

Network 105B is coupled to agent circuits 115C-D. Broadly speaking, the components coupled to network 105B may be referred to as SoC agents to distinguish them from those components coupled to network 105A. One or more of agent circuits 115C-D coupled to network 110B may also be considered to be input/output (I/O) devices or I/O agents, a broad category that can include an internal or external display, one or more cameras (including associated image signal processor circuits), a Smart IO circuit, and interfaces to various buses such as USB and PCIe. Such circuits can thus be considered to be both SoC agents and I/O agent circuits, where I/O agent circuits are a subset of SoC agents. Other types of agent circuits 115 coupled to network 105B are possible, including a secure enclave processor, a neural processing engine, JPEG codec circuits, video encoding/decoding circuits, a power manager circuit, an always-on (AON) circuit, etc. Such circuits may thus be SoC agent circuits but not I/O agent circuits. In some embodiments, SoC agents may also be connected to agent circuits acting as memory controllers, allowing agent circuits 115C-D to access system memory 160.

Networks 105C-D are coupled to GPUs 115E-H. GPUs are thus another type of agent circuit. In some embodiments, GPUs may also be connected to agent circuits acting as memory controllers, allowing agent circuits 115E-H to access system memory 160.

Networks

A given network 105 is composed of various elements, such as network switches and various wires, buses, interconnects, etc., which can collectively be referred to as the "fabric" of that network. A given network 105 can be arranged according to any suitable network topology, including ring, mesh, star, tree, etc. Each network 105 may employ a topology that provides the bandwidth and latency attributes desired for that network, for example, or provides any desired attribute for the network. Thus, generally, computer system 100 may include at least a first network constructed according to a first topology and a second network constructed according to a second topology that is different from the first topology. Note that the first and second network may be packet-switched networks in some embodiments. In some cases, each network may have different operational parameters—for example, different types of network transactions (e.g., different types of snoops), different types of properties for transactions, different transaction ordering properties, etc.

Generally speaking, the ordering properties of a given network specify which communications on the network are required to remain in order. Communications for which a particular order is not required may be reordered on the network (e.g., a younger communication may complete before an older communication). For example, a "relaxed"-order network used with GPUs may have reduced ordering constraints compared to CPU and I/O networks. In an embodiment, a set of virtual channels and subchannels within the virtual channels are defined for each network. For the CPU and I/O networks, communications that are between the same source and destination agent, and in the same virtual channel and subchannel, may be ordered. For the relaxed-order network, communications between the same source and destination agent may be ordered if they are to the same address (at a given granularity, such as a cache block). Otherwise, the communications need not be ordered. Because less strict ordering is enforced on the relaxed-order network, higher bandwidth may be achieved on average since transactions may be permitted to complete out of order if younger transactions are ready to complete before older transactions, for example. Other ordering constraints may be implemented in other embodiments. For example, the ordering requirements defined for a peripheral component interconnect (PCI) and its various versions such as PCIe may be implemented.

Given the different functionalities of networks 105, these networks can operate independently from one another. Networks 105 may be physically independent (e.g., having dedicated wires and other circuitry that form the network) and logically independent (e.g., communications sourced by agent circuits 115 in computer system 100 may be logically defined to be transmitted on a selected network 105 of the plurality of networks and thus not impacted by transmission on other networks 105). In some embodiments, network switches may be included to transmit packets on a given network. The network switches may be physically part of the network (e.g., there may be dedicated network switches for each network). In other embodiments, a network switch may be shared between physically independent networks and thus may ensure that a communication received on one of the networks remains on that network.

By providing physically and logically independent heterogeneous networks, high bandwidth may be achieved via parallel communication on the different networks 105. Additionally, different traffic may be transmitted on different networks 105, and thus a given network 105 may be optimized for a particular type of traffic. For example, processor circuits 115A-B may be sensitive to memory latency and may cache data that is expected to be coherent among the processors and memory 160. Accordingly, network 105A, to which processor circuits 115A-B are coupled may be optimized to provide the required low latency for transactions between these components. There may be separate virtual channels for low latency requests and bulk requests, in various embodiments. The low latency requests may be favored over the bulk requests in forwarding around the network and by the memory controllers. The CPU network may also support cache coherency with messages and protocols defined to communicate coherently.

As used herein, "virtual channels" are channels that physically share a network but which are logically independent of each other on the network. Accordingly, communications in one virtual channel between network elements do not block progress of communications on another virtual channel between the network elements. A particular virtual channel may be implemented by used routing storage dedicated to that channel. A given virtual channel may have one or more sub-channels.

Given the foregoing description, it is apparent that different ones of networks 105 may be heterogeneous, with different topologies, communication protocols, semantics, ordering properties, etc. Networks 105A and 105B may implement different cache coherency protocols, for example. In embodiments that include a GPU network, such a network and networks 105A-B may each include different ordering properties (e.g., different cache coherency properties such as strict or relaxed ordering), given the different function and design specifications of each network.

Additional details about possible computer system arrangements including networks 105 can be found in the following commonly assigned applications: U.S. application Ser. No. 17/337,805 entitled "Multiple Independent On-chip Interconnect," filed on Jun. 3, 2021; and U.S. application Ser. No. 17/821,296 entitled "Scalable System on a Chip," filed on Aug. 22, 2022. Both applications are incorporated by reference herein in their entireties.

Preventing Deadlock Via Credit Schemes

The computer system designs described herein include multiple networks, each having switches and other hardware (generically, "switch elements") that connect source agent circuits and destination agent circuits. Each of those switch elements has some finite amount of storage, and can potentially receive data (e.g., a packet) from multiple different sources (and/or need to route the data to different destinations). It is desirable for networks to be designed to prevent deadlock, such as might occur in the case of "head of line blocking," when a packet at top of a queue cannot be routed due to lack of storage at the next hop or higher-level dependencies.

One mechanism to prevent deadlock is the use of a credit scheme. This scheme requires a source agent circuit, before it issues a packet on the network, to have a "credit" (or "network credit") that was provided by the destination of that packet (which equates to a buffer location in which the packet can be stored). A credit, as used herein, is a type of received indication from another entity in the system that represents the ability to send network traffic. A credit can be specified, for example, in a message received over a network 105, and may be stored in a structure that can be referred to as a credit buffer. When a source is issued a credit from a destination, a corresponding packet is guaranteed to be able to move into the destination because there is a buffer location for that packet. Every packet, whenever it has an opportunity to exit the network at its destination, has a buffer location and therefore does not block up the switches indefinitely. Transmission from source to destination may also involve the use of other, intermediate credit schemes. Note that a "packet" is a communication from a source to a destination. In addition to facilitating network communication, credit schemes may also be used within a particular circuit to ensure that certain resources may be appropriately reserved as described herein.

At initialization, each destination may transmit one or more credits to each source that can communicate with it. The total number of credits that the destination can send out over all its sources is limited to the total number of buffer locations that it has. When the source wants to send a packet, it checks its credit count for the destination of the packet. If the source's credit count for the destination is zero, the source will wait to send the packet. If the credit count is non-zero, the source consumes a credit (deducts it from its credit count for the destination) and sends the packet. When the packet arrives at the destination, the destination stores it in a buffer location (which is guaranteed to be available because the credit represents a location in the buffer, although not necessarily a specific buffer location). Once the destination removes the packet from the buffer, freeing the location, it transmits the credit back to the source. The source adds the credit to its credit count and can use it to send another packet.

There are various possible nuances to credit schemes. For example, the mechanism for returning credits may vary. Sometimes the credits can be piggybacked on other packets going to the source, but usually a dedicated credit return packet is employed. Aggregated credits might be returned at the same time, usually with a timeout so that credits do not accumulate for too long. In the case of virtual channels, credits can be allocated per source and per virtual channel, thereby keeping independence between the channels. In some cases, packets may have different sizes, and thus credits equaling a certain number of bytes might be used, with the condition that a source needs enough credits to at least equal the number of bytes in the packet. There might also be separate command and data credits, which may require having both types of credits if a packet being sent includes both command and data portions. While the schemes may vary, for a given system, the scheme is typically set a priori using fuses, non-volatile memory, etc.

FIG. 5A is a block diagram of one embodiment of the ingress, or upstream, path of NI circuit 410. This path, which originates from source agent circuits in the computer system, may also be referred to as the input path. As depicted, upstream path 500 includes a set of input buffers 510, arbiter circuit 520, command queue circuit 530, data buffer circuit 540, and command interface circuit 535.

In one embodiment, input buffers 510 are end-to-end (E2E) buffers, which store indications of network credits that the source agents must have prior to issuing a request on the network. When a request (read request, write request with data, etc.) arrives at NI circuit 410, the request includes a command and, optionally, data. Thus, the E2E buffers may be a combination of commands and data in various embodiments. In FIG. 5A, memory access requests received from network 105 may thus be apportioned to input buffers 510, command queue circuit 530, and, when needed, data buffer 540. In one embodiment, input buffers 510 are organized by plane, and within each plane by virtual channel/sub-channel in various embodiments. A set of entries for a particular plane/virtual channel/sub-channel may constitute a linked list, where a given entry in a particular linked list includes pointers to command and, when applicable, data portions stored in command queue circuit 530 and data buffer circuit 540.

Upon receipt of a memory access request, NI circuit 410, in addition to storing information about the request in input buffer 510, command queue circuit 530, and (in some cases) data buffer circuit 540, also allocates an entry in a completion buffer (shown and discussed in FIG. 5B), which is part of the downstream path through NI circuit 410 and is used after the memory access request has been completed. With information about different memory access requests stored in various ones of input buffers 510, arbiter circuit 520 is thus able to arbitrate between these requests (which may originate from different networks 105) to select a request to be dispatched to one or more memory planes coupled to upstream path 500. In the depicted embodiment, upstream path 500 is coupled to two memory plane controller circuits 110A and 110B, but it could be coupled to a single memory controller circuit or more than two memory plane controller circuits in other embodiments.

The selected command is transmitted to buffers 210 in the arbitration circuit 120 for the determined memory controller circuit 110. The data for a particular command, however, may remain in data buffer 540 until such time as the command is guaranteed to cross GOP. This data (which is commonly write data for a memory write request) is retained by NI circuit 410 until the data is ready to be written to memory cache circuit 130 (or system memory 160), thus reducing the amount of data movement in computer system 100, as well as conserving power. When data is needed, it can be written to data pipes of a corresponding memory controller circuit 110 as shown in FIG. 5A.

As has been described throughout this disclosure, when a particular command is selected for transmission to arbitration circuit 120, the command will be able to reach completion in memory controller circuit 110 without needing to be returned to NI circuit 410—for example, due to lack of some resources in memory controller circuit 110. Selecting a command for transmission to arbitration circuit 120, in various embodiments, thus may involve NI circuit 410 obtaining, e.g., a credit that guarantees space within circuit 120. In some implementations, a request to obtain credit for arbitration circuit 120 might involve arbitration circuit 120 ensuring that credit can be obtained for retry queue circuit 150. In other implementations, NI circuit 410 might obtain credit for both arbitration circuit 120 and retry queue circuit 150 before selecting a command for issuance to arbitration circuit 120. But in each of these implementations, it is guaranteed that once a command crosses the boundary of network 105 into memory controller circuit 110, that command will have sufficient resources to complete and will be kicked back to NI circuit 410 for re-submission. As has been described, in some embodiments, sufficient resources can be guaranteed based on an entry in retry queue circuit 150 being reserved. Accordingly, if any resources for a memory access request within memory controller circuit 110 other than retry queue circuit 150 are unavailable, the retry queue circuit entry provides a place to store information about the request until such time as those resources become available. Retry queue circuit 150 in effect provides a guaranteed place to "park" information for a particular command, such that the command does not need to be returned to NI circuit 410 due to lack of available resources. Ensuring a reservation in circuit 150 before issuing a memory access request to arbitration circuit 120 makes this guarantee possible.

Accordingly, FIG. 5A depicts an NI circuit that is configured to store a command portion of the memory access request in a command queue circuit and a data portion of the memory access request in a data buffer circuit. The NI circuit is configured to forward the command portion, but not the data portion, to the memory controller circuit. The memory controller circuit is configured to access data from the data buffer circuit as the data portion is needed during processing of the memory access request.

FIG. 5B, on the other hand, is a block diagram of one embodiment of a downstream path 550 of NI circuit 410 that is connected to two memory plane controller circuits 110A-B. As depicted, downstream path 550 includes a set of circuitry that is mirrored for each of the two planes—that is, a set of circuitry for memory plane controller circuit 110A, and a set of circuitry for memory plane controller circuit 110B. This circuitry includes input multiplexer circuits 555A-B, completion buffer circuits 560A-B (which include command queue circuits 570A-B and data buffer circuits 580A-B), and output snoop queue circuits 590A-B. Downstream path 550 further includes output multiplexer circuit 565 and output interface circuit 575, which is coupled to network 105A.

As described with reference to FIG. 5A, when upstream path 500 issues a command to arbitration circuit 120, it does so after reserving an entry in completion buffer circuit 560 (either 560A or 560B, as the case may be). This reservation (shown as preallocation 552) ensures that there will be a place to store information relating to a result of the memory access request. FIG. 5B depicts that NI circuit 410 includes a completion buffer circuit for storing information relating to completed memory access requests, where the NI circuit is configured to allocate an entry in the completion buffer circuit for the memory access request in response to receiving the memory access request from the network.

As an example, memory controller circuit 110A may include a variety of output queues, each of which is coupled to input multiplexer circuit 555A. Multiplexer circuit 555A is configured to select between these entries and send the selected entries to completion buffer circuit 560A, updating constituent portions such as command queue circuit 570A and data buffer circuit 580A as needed. A corresponding path also exists for sending data to completion buffer circuit 560B via multiplexer circuit 555A.

Multiplexer circuits 555 can also send snoop requests to output snoop queue circuits 590. These snoop requests may occur, as described above, when a memory access request has a hit in directory pipeline circuit 310 that indicates that a snoop message is to be sent to one or more coherent agents within computer system 100. FIG. 5B thus depicts that NI circuit 410 may further include an output snoop buffer circuit configured to store snoop requests to be sent over the network.

The outputs of completion buffer circuits 560A-B and output snoop queue circuits 590A-B feed into output multiplexer circuit 565. Arbitration between these sources, which may be based on a variety of factors such as age, QoS, and the like, may then be performed, and a result of a particular memory access request may be selected to be sent to network 105 via output interface circuit 575. Circuit 575 may handle network credit processing (e.g., E2E credits) in one embodiment.

The foregoing passages describe a computer system with a memory controller circuit in which memory access requests received at an arbitration circuit are guaranteed to have entries in a retry queue circuit. As has been noted, reservation of such entries ensures that once a memory access request is accepted by the memory controller circuit, that request will be handled without having to return the request to the network for resubmission to the memory controller circuit. In this manner, a "hard boundary" is enforced for requests between the memory controller circuit and the network/network interface circuit.

Apart from the use of the retry queue circuit, the present disclosure has also described an apparatus in which one or more NI circuits are tightly coupled to a memory controller circuit. In some implementations, NI circuits can be said to act as both ingress and egress stages of the memory controller circuit for corresponding network. Such an apparatus, with reference to exemplary reference numerals, may include a computer system (100) that includes, on one or more co-packaged integrated circuits (ICs), a plurality of networks (105); a memory controller circuit (110) configured to process memory access requests (102) addressed to a system memory (160), and a plurality of network interface (NI) circuits (410).

A given one of the plurality of NI circuits is configured to store memory access requests from a corresponding one of the plurality of networks in an input queue circuit; allocate, for a particular one of the memory access requests, an entry in a completion buffer circuit (560) of the given NI circuit to store results of the particular memory access request being processed by the memory controller circuit; and send the particular memory access request from the input queue circuit to the memory controller circuit based on the entry in the completion buffer circuit of the given NI circuit being allocated. (In some embodiments, the input queue circuit is configured to separately store command and data portions of the particular memory access request.) Additionally, the memory controller circuit includes an arbitration circuit (120) configured to receive memory access requests from the plurality of NI circuits; arbitrate between memory access requests to select a memory access request to be processed by the memory controller circuit; and issue the selected memory access request for further processing by the memory controller circuit.

In some implementations, the plurality of networks includes a first network coupled to a first plurality of agent circuits that includes central processing units (CPUs); a second network coupled to a second plurality of agent circuits that includes input/output (I/O) agent circuits; and a third network coupled to a third plurality of agent circuits that includes graphics processing units (GPUs). The plurality of network interface (NI) circuits includes a first NI circuit coupled between the first network and the memory controller circuit, a second NI circuit coupled between the second network and the memory controller circuit, and a third NI circuit coupled between the third network and the memory controller circuit. The arbitration circuit is configured to select between memory access requests received from at least the first, second, and third NI circuits. In some cases, one or more of the first, second, and third networks have different ordering properties.

In some embodiments, the given one of the plurality of NI circuits mentioned above is configured to separately manage credits for transactions (e.g., memory access requests) sent over the corresponding network for each of a group of source agent circuits coupled to the corresponding network. Credits may be separately managed for each of multiple virtual channels between a given source agent circuit and the memory controller circuit. The given NI circuit may also be configured, for a memory access write operation, to forward a command portion of the particular memory access request to the memory controller circuit upon arrival of the particular memory access request in the input queue circuit; and send an indication to the memory controller circuit when the data portion of the particular memory access request arrives. The memory controller circuit, in turn, may be configured to retrieve the data portion of the particular memory access request from the input queue circuit when the data portion is needed for processing within the memory controller circuit. In some implementations, the given NI circuit may include an output snoop buffer circuit (590) for storing information relating to snoop requests generated by the memory controller circuit. The given NI circuit may also include a downstream arbitration circuit (565) configured to select entries from the completion buffer circuit and the downstream snoop buffer circuit to be forwarded to the corresponding one of the plurality of networks. The memory controller circuit may be one of a plurality of memory plane controller circuits, and the downstream arbitration circuit may be configured to select entries from the completion buffer and the downstream snoop buffer circuit for two or more memory plane controller circuits to be forwarded to the corresponding one of the plurality of networks.

Figure 6A:
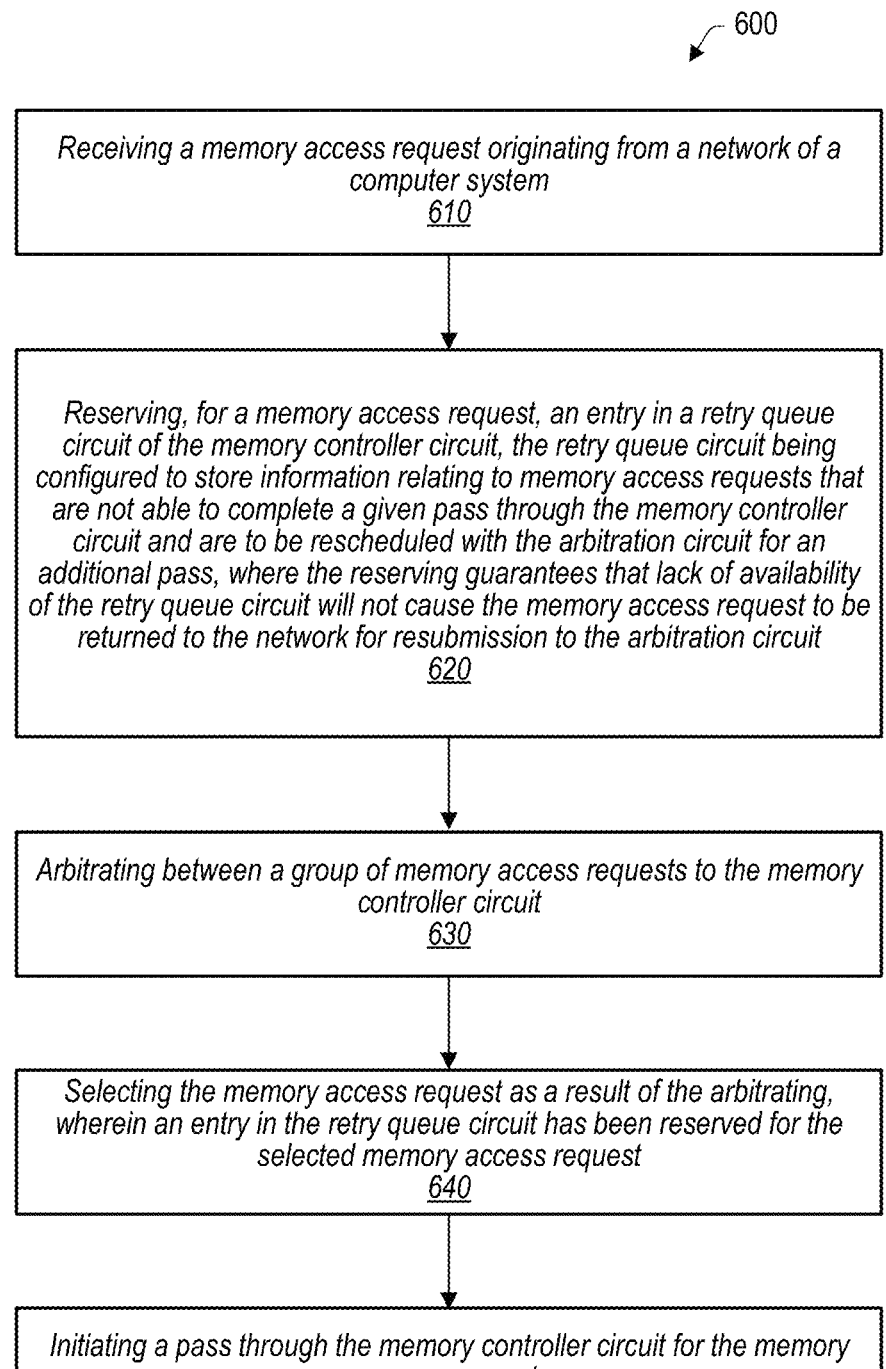
FIG. 6A is a flow diagram of one embodiment of a method for reserving an entry in a retry queue circuit of a memory controller circuit of a computer system.

FIG. 6A is a flow diagram of one embodiment of a method 600 for processing a memory access request that includes ensuring a reservation of an entry in a retry queue circuit. Method 600 is explicitly recited as being performed by an arbitration circuit within a memory controller circuit. In other embodiments, variations of method 600 may be performed by other circuitry within a memory controller circuit. Exemplary reference numerals to previously described structure and elements is provided for convenience in the description of method 600, but they are not intended to unduly limit the scope of this method.

Method 600 begins in 610, in which an arbitration circuit (120) within a memory controller circuit (110) receives a memory access request (102) originating from a network (105) of a computer system (100). This computer system is implemented on one or more co-packaged integrated circuit (IC) dies. Method 600 may thus be variously performed on a computer system implemented on a single IC die (i.e., a computer system implemented on an SoC) or on multiple IC dies (i.e., a computer system having a chiplet architecture).

Method 600 continues in 620, in which the arbitration circuit reserves, for the memory access request, an entry (152) in a retry queue circuit (150) of the memory controller circuit. The retry queue circuit is configured to store information relating to memory access requests that are not able to complete a given pass through the memory controller circuit (e.g., through tag pipeline circuit 140) and are to be rescheduled with the arbitration circuit for an additional pass. This reservation made by the arbitration circuit guarantees that lack of availability of the retry queue circuit (or more generally, lack of availability of resources within the memory controller circuit) will not cause the memory access request to be returned to the network for resubmission to the arbitration circuit.

In 630, the arbitration circuit arbitrates between a group of memory access requests to the memory controller circuit for which entries are reserved in the retry queue circuit. In 640, the arbitration selects the memory access request as a result of the arbitrating of 630. Significantly, an entry in the retry queue circuit has been reserved for the selected memory access request. For example, the arbitration circuit may have reserved an entry in the retry queue circuit before commencing the arbitrating of 630, and then can assign the selected memory access request to the reserved entry. Finally, in 640, the arbitration circuit initiates a pass through the memory controller circuit for the memory access request.

Many variations of method 600 are contemplated. In some embodiments, the memory access request is received from a network interface (NI) circuit (410) of the network. Method 600 may further include, after completion of the memory access request, storing information relating to results of the memory access request in an entry in a completion buffer circuit (560) of the NI circuit, the entry being initially allocated upon receipt of the memory access request from the network and prior to the memory access request being sent to the memory controller circuit.

Method 600 may include, in some embodiments, storing information relating to the memory access request in the retry queue circuit in response to detection of an address hazard associated with the memory access request. For example, the address hazard may indicate that the cache line being addressed is locked. The method may further include reissuing the memory access request to the arbitration circuit in response to the address hazard being resolved.

Some variations of method 600 may involve snoop commands. For example, the method may include storing snoop information in a particular snoop queue entry (314) in a snoop queue circuit (315) in response to detecting that a previous memory access request requires one or more snoop commands. The method may further include storing information relating to the memory access request in the retry queue circuit in response to performing an address lookup for the memory access request against entries in the snoop queue circuit, as well as determining that an address hit exists for the particular snoop queue entry. Notably, the retry queue circuit is configured to reissue the memory access request to the arbitration circuit in response to completion of a snoop command for the particular snoop queue entry.

FIG. 6B is a flow diagram of one embodiment of a method 660 for processing a memory access request. Method 660 is explicitly recited as being performed by a network interface (NI) circuit within a memory controller circuit, and illustrates how the NI circuit can be configured to be tightly coupled to the memory controller circuit, effectively serving as ingress and egress stages for that circuit. This method also recites that one NI circuit is coupled to different memory plane controller circuits, and that a given memory plane controller circuit is coupled to multiple NI circuits. Exemplary reference numerals to previously described structure and elements are provided for convenience, but are not intended to unduly limit the scope of method 660.

Method 660 begins at 665, with the NI circuit (410) of a computer system (100) receiving, from a particular one of a plurality of networks (105) of the computer system formed on one or more co-packaged integrated circuits (ICs), a memory access request (102) directed to an address within a system memory (160). Next, at 670, the NI circuit separately stores command and data portions of the memory access request in an input queue circuit (e.g., command portions in a command queue circuit (530) and data portions in a data buffer circuit (540) of upstream path 500). The NI circuit, at 675, allocates an entry in a completion buffer circuit (560) of the NI circuit, the completion buffer circuit being configured to store results of the memory access request after processing by one of a plurality of memory plane controller circuits (110) to which the NI circuit is coupled.

The NI circuit then sends, in 680, a command portion of the memory access request from the input queue circuit to a particular one of the plurality of memory plane controller circuits based on the entry in the completion buffer circuit of the NI circuit being allocated. Subsequently, the NI circuit receives, in 685 from the particular memory plane controller circuit, result information relating to results of the memory access request that has been processed by the particular memory plane controller circuit. The NI circuit then stores, in 690, the result information in the allocated entry in the completion buffer circuit, and, in 695, forwards the result information from the allocated entry in the completion buffer circuit to the particular network. Forwarding the result information may include selecting between information stored in the completion buffer and information stored in an output snoop queue circuit (590) located in the NI circuit. Similarly, forwarding the result information may include selecting between information stored in completion buffer circuits and output snoop queue circuits associated with at least two of the plurality of memory plane controller circuits.

Many variations of method 660 are contemplated. One such variation includes the NI circuit sending a data portion of the memory access request to the memory controller circuit only after the particular memory plane controller circuit requests the data portion. In some variations, the method includes managing network credits for transmission over the particular network to the NI circuit from a source agent circuit coupled to the particular network.

In some implementations the particular memory plane controller circuit is configured, upon receiving the memory access request from the NI circuit, to reserve sufficient internal resources to guarantee that the memory access request can be handled by the particular memory plane controller circuit and will not be returned to the NI circuit for resubmission to the particular memory plane controller circuit. For example, the sufficient internal resources may include an entry in a retry queue circuit (150) configured to store information for memory access requests that, during a given pass through the particular memory plane controller circuit, are determined to require another pass through the particular memory plane controller circuit.

Reservation of Resources for Memory Cache Hit

Another innovation with respect to memory controller circuits will now be described with respect to FIGS. 7-11. The subject matter described with respect to these figures can be implemented independently of the subject matter described above with respect to FIGS. 1-6. In other words, the subject matter described with respect to FIGS. 7-11 may or may not be implemented in conjunction with implementation of the subject matter of FIGS. 1-6. That said, the various concepts and structures described with respect to FIGS. 1-6 may also be referred to within this section.

Figure 7:
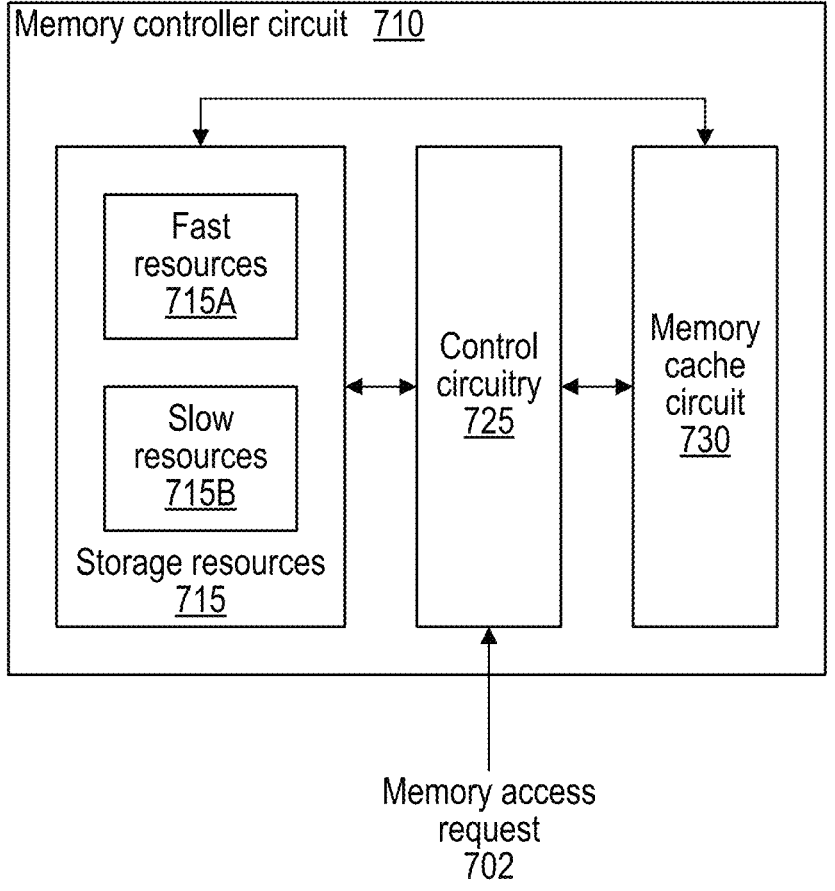
FIG. 7 is a block diagram of one embodiment of a memory controller circuit within different sets of resources needed for different outcomes of a memory access request.

FIG. 7 is a block diagram of one embodiment of a memory controller circuit that is configured to implement different strategies for reserving so-called "fast" and "slow" resources. As used herein, a "resource" is some hardware (i.e., circuitry) within a computer system. Commonly, a resource may have entries that can be reserved to ensure that the resource can stored information for a particular transaction such as a memory access request. For this reason, resources may also be referred to as storage circuit resources herein.

As depicted, memory controller circuit 710, which can have similarities to memory controller circuit 110 described at length above, includes memory cache circuit 730 (analogous to memory cache circuit 130), control circuitry 725, and storage circuit resources 715. A subset of storage circuit resources 715 may be designated as fast circuit resources 715A, while another subset may be designated as slow circuit resources 715B. An explanation of the terms "fast" and "slow" is provided below.

Memory cache circuit 730 is analogous to memory cache circuit 130 described above. Control circuitry 725 is an umbrella term for the logic circuits used to receive memory access requests, address memory cache circuit 730, interface to system memory, etc. Arbitration circuit 120 and tag pipeline circuit 140 described above are examples of possible types of control circuitry 725. Storage circuit resources 715 refers to circuitry used to store information about memory access requests, associated data, etc. within memory controller circuit 710. Retry queue circuit 150 is one type of storage circuit resource. A detailed set of storage circuit resources for one possible implementation of memory controller circuit 730 is described below with respect to FIG. 8.

As is understood in the art, from the perspective of a memory subsystem of a computer system, a cache hit results in a lower latency relative to a cache miss. A cache hit can thus be considered to represent the "fast" memory access scenario. Conversely, other results of memory access requests—cache misses and snoops, for example—can result in relatively "slow" memory access scenarios, as such cases take longer to handle than a cache hit. In the event of a cache miss, an access to system memory may be needed, while in the event of a snoop, the snoop is broadcast and response messages must be received from other coherent actors. Because the cache hit, cache miss, and snoop scenarios have different outcomes, it can be understood that different storage circuit resources within memory controller circuit 710 may need to be accessed in each case. For example, in a cache hit, system memory does not need to be accessed; accordingly, certain storage circuit resources associated with system memory are not accessed in the event of a cache hit. For purposes of the disclosure, the set of storage circuit resources needed in the event of a cache hit are referred to as fast resources 715A, while those resources that are needed in the event of a result other than a cache hit are referred to as slow resources 715B. Note that the exact nature of fast resources 715A and slow resources 715B may vary in different implementations of memory controller circuit 710. As will be described with respect to FIG. 9, there may be a different set of slow resources for snoops than for cache misses.

Control circuitry 725 is configured, in response to receiving a memory access request 702, to attempt to reserve, prior to a determination of whether the memory access request hits in memory cache circuit 730, fast resources 715A—that is, those resources in storage circuit resources 715 that are needed to process a cache hit. This attempt to reserve is performed without necessarily attempting to reserve entries in other sets of storage circuits of the plurality of storage circuits that are needed to process other possible outcomes of the memory access request, including a cache miss or snoop. Control circuitry 725 is configured to initiate processing of the memory access request based on successfully reserving entries in each of the storage circuit resources in fast resources 715A. The control circuitry is configured to inhibit processing of the memory access request based on being unable to reserve an entry in at least one of the storage circuit resources in fast resources 715A.

Figure 8:
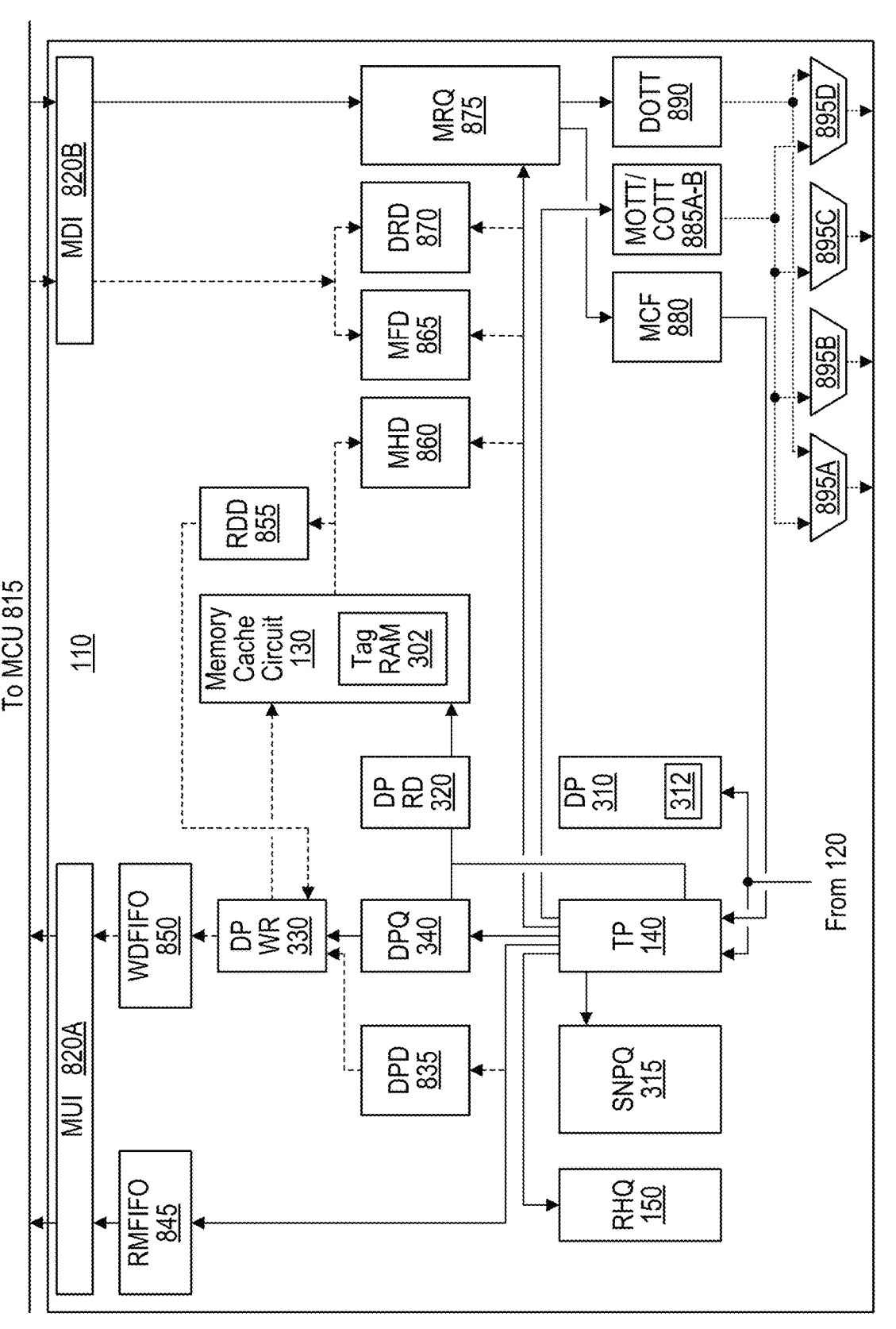
FIG. 8 is a block diagram of one embodiment of a memory controller circuit that includes a memory cache circuit.

FIG. 8 is a detailed block diagram of one embodiment of memory controller circuit 110. This figure is intended to provide only a high-level overview of memory controller circuit 110; accordingly, all possible data flows are not shown. The intent of this figure is to illustrate various possible examples of storage circuit resources 715 that may exist within a memory controller circuit. This figure thus provides context for a specific embodiment of fast-resource reservation described below with respect to FIGS. 10-11. Several structural elements shown in FIG. 8 are the same as those previously described, and thus identical reference numerals are used for ease of explanation.

Memory access requests are dispatched from arbitration circuit 120 to both tag pipeline circuit 140 and directory pipeline circuit 310. Tag pipeline circuit 140 looks up the address of the request in its tag RAM 302. As described above, this lookup can determine whether there is a cache hit or miss, as well as other things, such as whether the request hits on a pending snoop, is to a locked cache line, etc. Concurrently, directory pipeline circuit 310 checks the coherence directory RAM 312 to determine if the memory access request generates a snoop that needs to be broadcast on a network 105 of computer system 100.

Possible outcomes of submission of the memory access request to tag pipeline circuit 140 and directory pipeline circuit 310 include 1) the request being placed in snoop queue circuit 310 based on the request generating a snoop and/or 2) the request being placed in retry queue circuit 150 based on the request not being able to pass GOP. Retry queue circuit 150 and snoop queue circuit 315 are thus two examples of storage circuit resources 715.

If the memory access request is a cache hit, the corresponding cache line will reside in memory cache circuit 130 (the corresponding cache line will be a cache line to be read if the request is a read, and a cache line to be written to if the request is a write). In either event, in one embodiment, tag pipeline circuit 140 sends information to cache queue circuit 340 (referred to as DPQ). Depending on whether the request is a read or a write, it will travel from DPQ 340 to either data pipe read circuit (DPRD) 320 or data pipe write circuit (DPWR) 330. In some cases (such as a read-modify-write request), a request may go into both DPRD 320 and DPRW 330 (and need multiple passes through the data pipe). In the event of a read, the data obtained from memory cache circuit 130 is sent to memory hit data buffer circuit (MHD) 860 as temporary storage before the read data is ultimately returned to the requesting agent circuit. RDD buffer circuit 855, in one embodiment, is used in the event of a read-modify-write as temporary storage for data that has been read out of memory cache circuit 130. DPRW 330 can then access that data, perform any modifications, and write the information back to memory cache circuit 130. Data pipe data buffer circuit (DPD) 835 is another temporary buffer that may be utilized in some cases to temporarily store data from other locations (e.g., tag pipeline circuit 140) before ultimately being written to memory cache circuit 130. DPQ 340, DPD 835, DPRW 330, DPRD 320, RDD 855, and MHD 860 are thus additional examples of storage circuit resources 715.

Memory channel unit interface circuit 820 is the interface between memory controller circuit 110 and memory channel unit circuit (MCU) 815, which is coupled to DRAM in system memory 160. (One embodiment of MCU 815 is described further with respect to FIG. 9.) It includes upstream portion MUI 820 (sending data to MCU 815) and downstream portion MDI 820B (receiving data from MCU 815). Write data FIFO (WDFIFO) circuit 850, for example, may be used to store dirty data being written from memory cache circuit 130 to system memory. Read data FIFO (RMFIFO) 845, on the other hand is used to store the command portion of requests that are being sent to system memory (e.g., the address, the portion of the memory line being changed, etc.). RMFIFO 845 and WDFIFO 850 are thus additional potential resources within storage circuit resources 715.

Memory fill data (MFD) buffer circuit 865 stores data that is provided either from system memory to be filled into memory cache circuit 130—for example, in the event of a cache miss. The corresponding command portion of the fill data is stored in memory cache fill command queue circuit (MCF) 880. Thus, when data is received from MDI 820B, a memory cache fill command from MCF 880 is sent to tag pipeline circuit 140 and then the memory fill data from MFD 865 can be written to memory cache circuit 130 through DPQ 340 and DPWR 330. DRD buffer circuit 870, in one embodiment, is used to store data from memory reads that has been returned via MDI 820B. MFD 865, MCF 880, and DRD 870 are yet more examples of storage circuit resources 715.

Memory response queue circuit (MRQ) 875 has entries that are allocated for any reads that are sent to system memory 160. These entries are used to track the command portions (e.g., address and other information) for these reads. The data corresponding to the command portions stored in MRQ 875 entries may be provide to one or more of two possible locations, in various embodiments. If the memory read is being performed to fill memory cache circuit 130, the data will be provided to MCF 880. The DRAM output transaction table circuit (DOTT) 890, on the other hand, is used to store data that is to be routed back to the requesting agent circuit. Data can be provided to both MCF 880 and DOTT 890—for example, in the event of a cache miss on a cacheable read, as data from system memory 160 will need to be provided to both memory cache circuit 130 and the source agent circuit. For a noncacheable read, data can be stored in DOTT 890 but not MCF 880. MRQ 875 and DOTT 890 are additional examples of storage circuit resources 715.

Memory cache hit output transaction table circuit (MOTT) 885A, in one embodiment, is used to store the command portions of memory access requests that are cache hits. For reads, MOTT 885A stores the corresponding command portion, while for writes, MOTT 885A stores, in one embodiment, a write response that will eventually be returned to the source agent circuit. MOTT 885A is yet another possible storage circuit resource 715.

Coherence output transaction table circuit (COTT) 885B is another storage circuit resource that may be used in some embodiments to perform snoops. As has been described above, computer system 100 is configured to perform both 3-hop and 4-hop snoops in some embodiments. COTT 885B is used to store snoop information that will eventually be sent on networks 105, and may be used for both 3-hop and 4-hop snoops. For 4-hop snoops, snoop queue circuit 314 is additionally employed as described above to capture snoop responses as the snoop command completes.

Outputs of these output transaction tables are provided to a variety of output arbitration circuits (OARB) 895A-D. OARBs 895 are configured to select from multiple inputs and convey the selected information to a corresponding network 105 (OARB 895A is coupled to network 105A; OARB 895B is coupled to network 105B; etc.). In this manner, the result of a memory access request may be sent to the source agent circuit 115.

Figure 9:
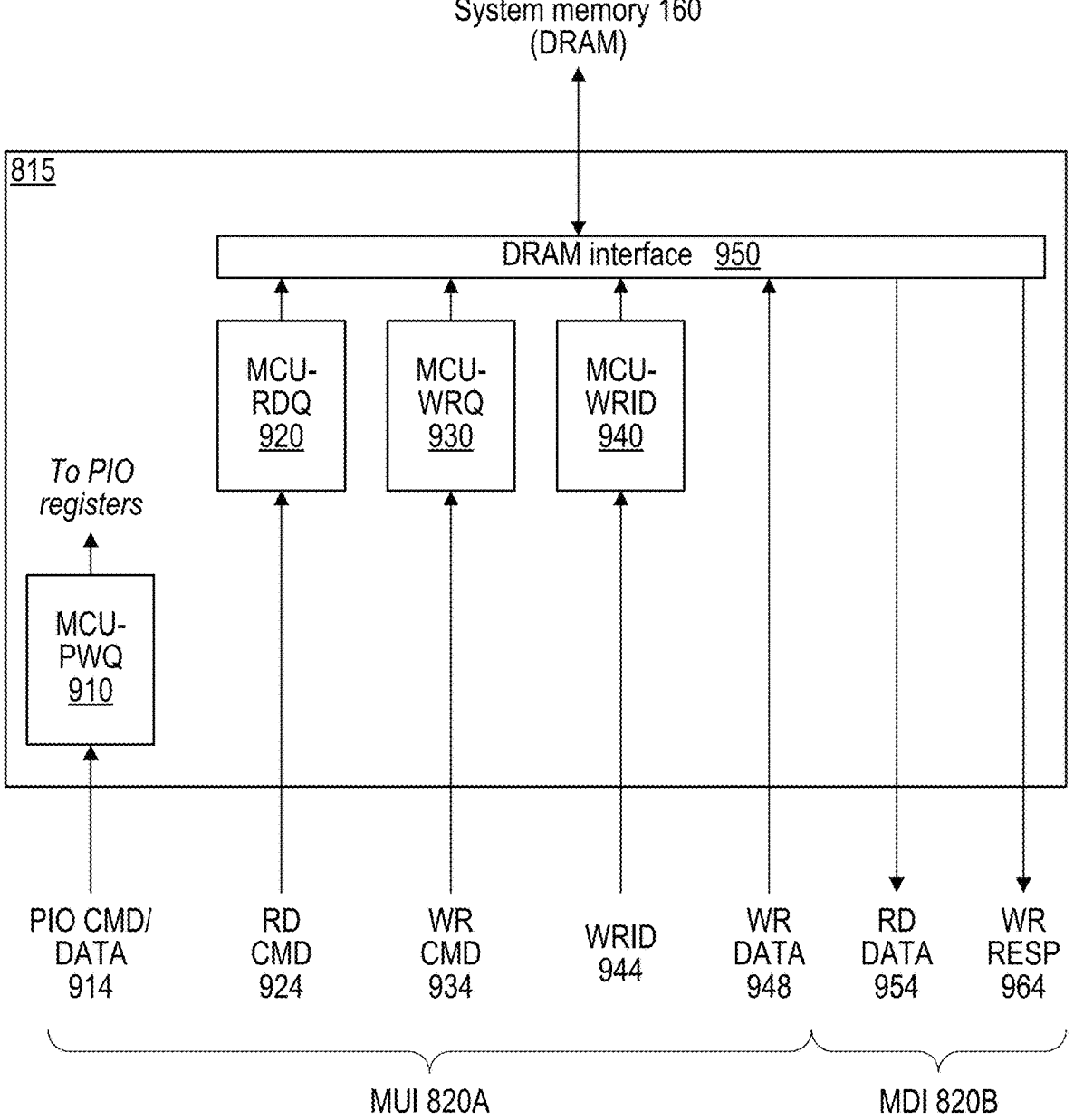
FIG. 9 is a block diagram that illustrates storage circuit resources within one embodiment of a memory controller circuit.

Additional types of storage circuit resources are also contemplated. FIG. 9 is a block diagram of one embodiment of MCU 815, and shows resources that may be accessed, such as in the event of a cache miss. As depicted, MCU 815 includes PIO Write Queue circuit (MCU-PWQ) 910, read queue circuit (MCU-RDQ) 920, write queue circuit (MCU-WRQ) 930, write id queue circuit (MCU-WRID) 940, and DRAM interface circuit 950.

In one embodiment, MCU 815 is the portion of memory controller 110 that provides the interface to DRAM located in system memory 160. The upstream and downstream portions of that interface that are accessed by the portions of memory controller circuit 110 shown in FIG. 8 are designated as MUI 820A and MDI 820B, respectively. MUI 820A can convey a variety of information including commands and data for programmed I/O (PIO CMD/DATA 914), memory read commands (RD CMD 924), memory write commands (WR CMD 934), memory write ids (WRID 944). MDI 820B, on the other hand, conveys memory read data (RD DATA 954) and memory write response data (WR RESP 964).

MCU 815 is configured to perform programmed input/output (PIO) reads and writes as specified by PIO CMD/DATA 914. These PIOs are reads and writes to and from registers within MCU 815 or system memory 160 in one embodiment. PIOs may be used for configuration settings, for example. MCU-PWQ 910 can be used to store a number of PIO commands until they are able to be executed in one embodiment.

MCU-RDQ 920, in one embodiment, is a buffer that is configured to store read command data for reads to system memory 160. In various embodiments, MCU-RDQ 920 can support virtual channels such as real-time (RT), low latency (LTT), and bulk. MCU-RDQ 920 can support hazards (e.g., read after write, write after read, write to read forwarding, etc.). Memory reads stored in MCU-RDQ 920 are eventually sent to system memory 160 via DRAM interface 950, returning RD DATA 954 to MDI 820B.

MCU-WRQ 930, in one embodiment, is a buffer that is configured to store write command data for writes to system memory 160. As with MCU-RDQ 920, MCU-WRQ 930 can support dependencies such as write after write, read after write, and write and read. In various embodiments, write data may be stored in NI circuit 410 until it is needed. For this reason, write ids are stored in MCU-WRID 940. These write ids are used in one embodiment to map WR CMD data to WR DATA 948 that is sent separately to DRAM interface 950. Write response data WR RESP is returned via MDI 820B. MCU-PWQ 910, MCU-RDQ 920, MCU-WRQ 930, and MCU-WRID are further possible examples of storage circuit resources 715.

Figure 10:
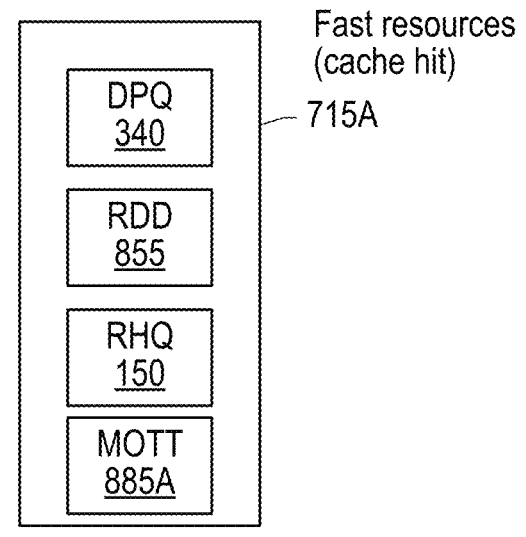
FIG. 10 is a block diagram that illustrates storage circuit resources within one embodiment of an interface to system memory within a memory controller circuit.
Figure 10:
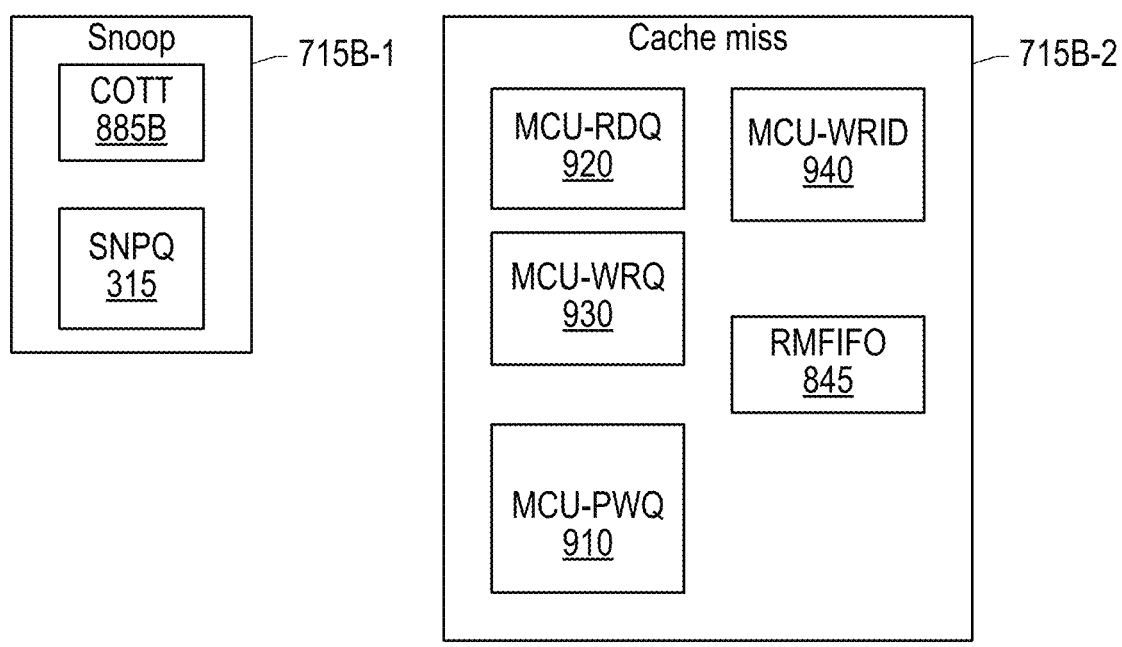

FIGS. 8-9 have described one embodiment of memory controller circuit, including various storage circuit resources. FIG. 10 now illustrates exemplary sets of fast and slow resources. As depicted, there are three sets of storage circuit resources: fast resources 715A (for a cache hit), slow resources 715B-1 (for a snoop) and slow resources 715B-2 (for a cache miss).

As noted, fast resources 715A correspond to those resources utilized for a cache hit. An entry in RHQ 150, as has been explained, has already been reserved upon a memory access request being submitted to memory controller circuit 110. An entry in MOTT 885A is utilized for any cache hit, either to store a command portion of a cache read, or a write response for a cache write. DPQ 340 is also utilized for a cache hit, as that resource is used to store data that ultimately goes into DPRD 320 or DPWR 330. RDD 855 is used for various cases—for instance, where data has been read and needs to be merged with other data. Reserving these resource ensures that a cache hit can be processed quickly.

Another possibility from a memory access request is that there is a hit in the coherence directory and a snoop is needed. COTT 885B may be used for both 3-hop and 4-hop snoops in some embodiments, as this resource stores a snoop message that will be sent through the downstream portion of NI circuit 410 and ultimately onto one of networks 105. SNPQ 315, in some embodiments, may be used only in the event of 4-hop snoops. COTT 885B and SNPQ 315 are thus part of the set of slow resources 715B-1.

Another set of slow resources, 715B-2, is used in the event of a cache miss. As shown, both MCU-RDQ 920 and MCU-WRQ 930 are part of this set (one or the other will be used depending whether the memory access request is a read or a write). MCU-PIO 910 is included in case the access is a PIO to registers within MCU 815. An entry in MCU-WRID 940 is also included, as this structure stores write ids used to map write command portion to decoupled write data, as described above. Finally, an entry in RMFIFO 845 is included, as that structure is used to access MCU 815.

Note that if there is a coherence directory hit, slow resources 715B-1 may be utilized in addition to fast resources 715 or slow resources 715B-2.

In some implementations, a particular enhancement has been made to allow DPQ 340 to be classified as a fast resource 715. In some cases, DPQ 340 is used for writes going either to memory cache circuit 130 or system memory 160. Even though it may be guaranteed that writes from DPQ 340 may be made quickly into memory cache circuit 130, the same may not be true for writes to system memory 160, which may take much longer. To address this issue, WDFIFO 850 may be managed as a slow resource. Thus, when a write to system memory 160 is needed, in addition to reserving those resources identified in slow resources 715B-2, an entry in WDFIFO 850 is also reserved. This reservation allows DPQ 340 to push data out of its storage and into WDFIFO 850 if needed. If an entry in WDFIFO 850 is not available, the write may be moved to RHQ 150 until one opens up.

Figure 11:
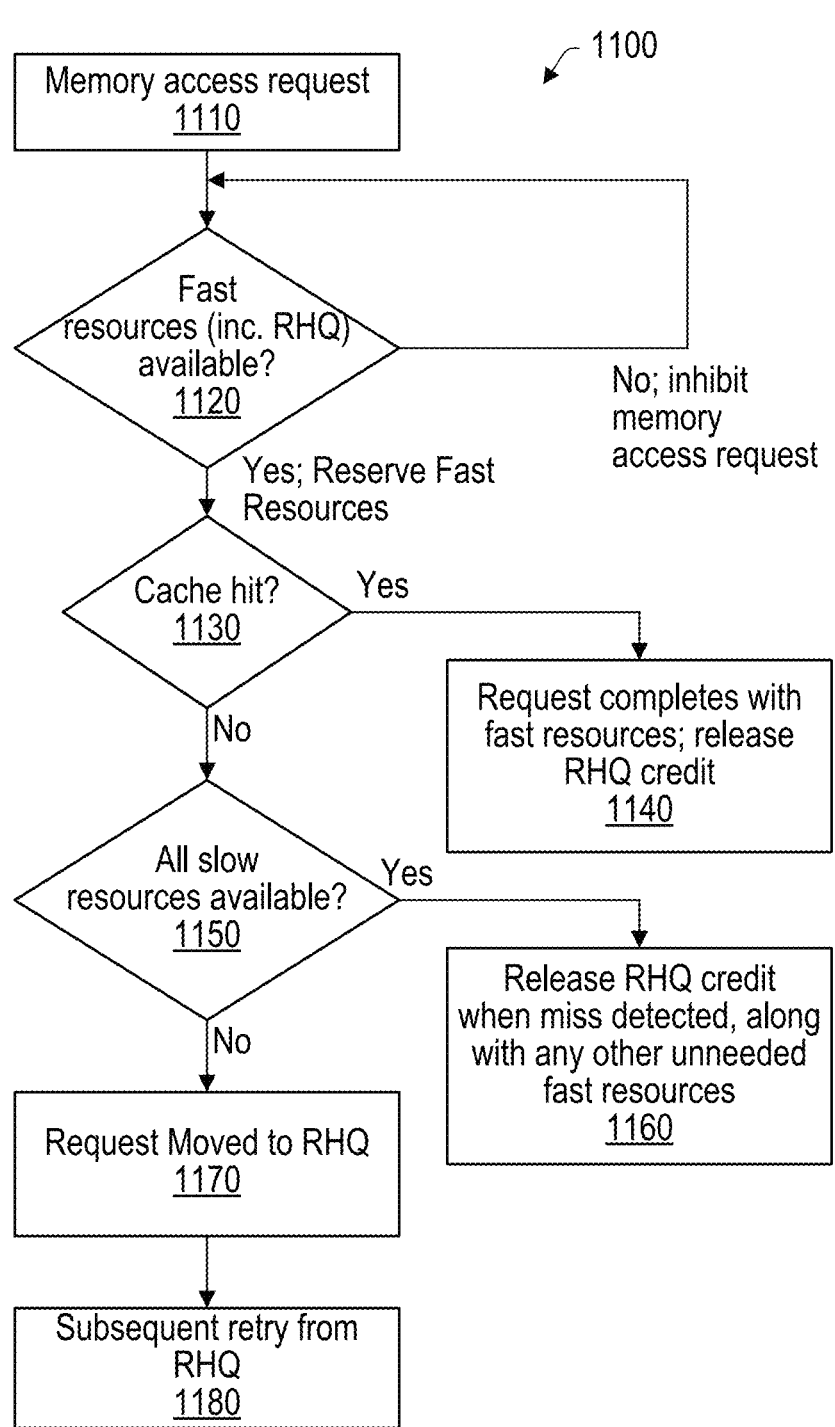
FIG. 11 is a flow diagram illustrating various possible resource reservation outcomes for different outcomes of a memory access request.

FIG. 11 illustrates a flow diagram of one embodiment of a method 1100 implemented by a memory controller circuit. Method 1100 begins with a memory access request in 1110. In 1120, an attempt is made to reserve fast resources 715A, which includes RHQ 150. If those resources are not available (the "no" branch of 1120), the memory access request is inhibited until such time as those resources become available. If those resources are available (the "yes" branch of 1120), they are reserved. As has been explained, fast resources 715A are those resources that are needed to process a cache hit. The method then continues at 1130. If the memory access request is a cache hit (the "yes" branch of 1130), the request completes in 1140 using fast resources 715A. Additionally, the entry in RHQ 150 can be released (e.g., by giving a credit back to retry queue circuit 150). This is the situation in which the speculation was correct—there is a cache hit—and the appropriate resources have been reserved for that scenario. Because this is the "fast" case, the hit can be processed and the RHQ credit can be released relatively quickly.

If, on the other hand, there is a cache miss (the "no" branch of 1130), the method continues at 1150, in which it is determined whether slow resources 715B-2 needed to process the cache miss are available. If all needed resources are available (the "yes" branch of 1150), the entry in RHQ 150 can be released at 1160, because it is now known what resources are needed to complete the memory access request, and those resources have been determined to be available. Additionally, any other unneeded fast resources can also be released at this time as part of 1160. (Those fast resources that are needed to process the miss may be retained until the miss is serviced.) If at least one slow resource is not available ("no" branch of 1150), the request is moved to RHQ 150 in 1170, and the request is subsequently retried from RHQ 150 in 1180.

Note that a variation of method 1100 exists in which slow resources may need to be reserved for a snoop, in addition to or instead of a cache miss.

Figure 12:
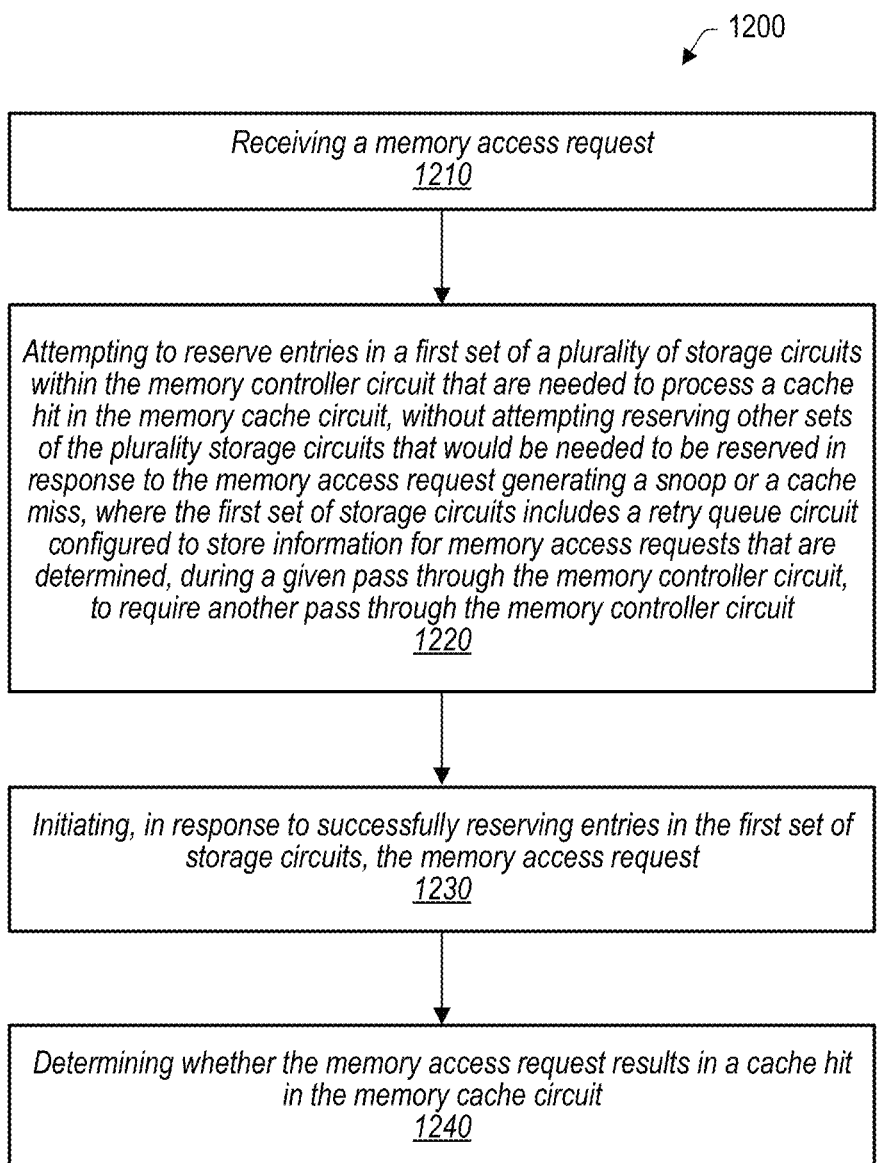
FIG. 12 is a flow diagram of one embodiment of a method for reserving resources within a memory controller circuit that are needed in the event of a cache hit.

FIG. 12 is a flow diagram of one embodiment of a method 1200 for reserving resources for a memory access request. Method 1200 is written from the perspective of a memory controller circuit. Exemplary reference numerals to previously described structure and elements is provided for convenience in the following description of method 1200. Such reference numerals, however, are not intended to unduly limit the scope of this method.

Method 1200 begins in 1210, in which a memory controller circuit (110) of a computer system (100) receives a memory access request (102). The computer system is made up of one or more co-packaged integrated circuits (ICs) that includes a memory cache circuit (130).

In 1220, the memory controller circuit attempts to reserve entries in a first set of a plurality of storage circuits (715A) within the memory controller circuit that are needed to process a cache hit in the memory cache circuit (130). This reservation is made without attempting to reserve other sets of the plurality storage circuits that would be needed to be reserved in response to the memory access request generating a snoop (715B-1) or a cache miss (715B-2). The first set of storage circuits includes a retry queue circuit (150) that is configured to store information for memory access requests that are determined, during a given pass through the memory controller circuit, to require another pass through the memory controller circuit. In 1230, the memory controller circuit, in response to successfully reserving entries in the first set of storage circuits, initiates the memory access request. Finally, in 1240, the memory controller circuit determines whether the memory access request results in a cache hit in the memory cache circuit.

Numerous variations of method 1200 are contemplated. For example, method 1200 may further include, in some embodiments, the memory controller circuit detecting a cache hit to the memory cache circuit for the memory access request. Further, the method may include the memory controller circuit detecting the cache hit and determining that the memory access request does not require a snoop to complete. In such a circumstance, the method may further include completing the memory access request using entries in the first set of storage circuits that have been reserved, as well as releasing a reserved entry in the retry queue circuit for the memory access request.

Still further, method 1200 may include the memory controller circuit detecting a cache hit to the memory cache circuit for the memory access request. Further, in response to the detecting the cache hit and determining that the memory access requires a snoop to complete, the method may further include reserving an entry in a snoop queue circuit (315), where the snoop queue circuit is not one of the first set of storage circuits. Still further, the method may include completing the memory access request using the reserved entry in the snoop queue circuit.

In the event of detecting a cache miss for the memory access request, the method may include making, by the memory controller circuit, a determination of availability of entries in a second set of the plurality of storage circuits that are needed to complete the memory access request (715B), the second set differing from the first set. The method may include, in response to detecting the cache miss and the determination of availability, releasing a reserved entry in the retry queue circuit, and releasing any other entries in the first set of storage circuits not needed to complete the memory access request.

In another scenario involving a detected cache miss for the memory access request, the memory controller circuit may make a determination of unavailability of one or more entries in a second set of the plurality of storage circuits that are needed to complete the memory access request, the second set differing from the first set. The method may include, in response to detecting the cache miss and the determination of unavailability, storing information relating to the memory access to a reserved entry in the retry queue circuit, the memory controller circuit being configured to cause the memory access request to be retried from the retry queue circuit at a later point in time.

Example Applications

Figure 13:
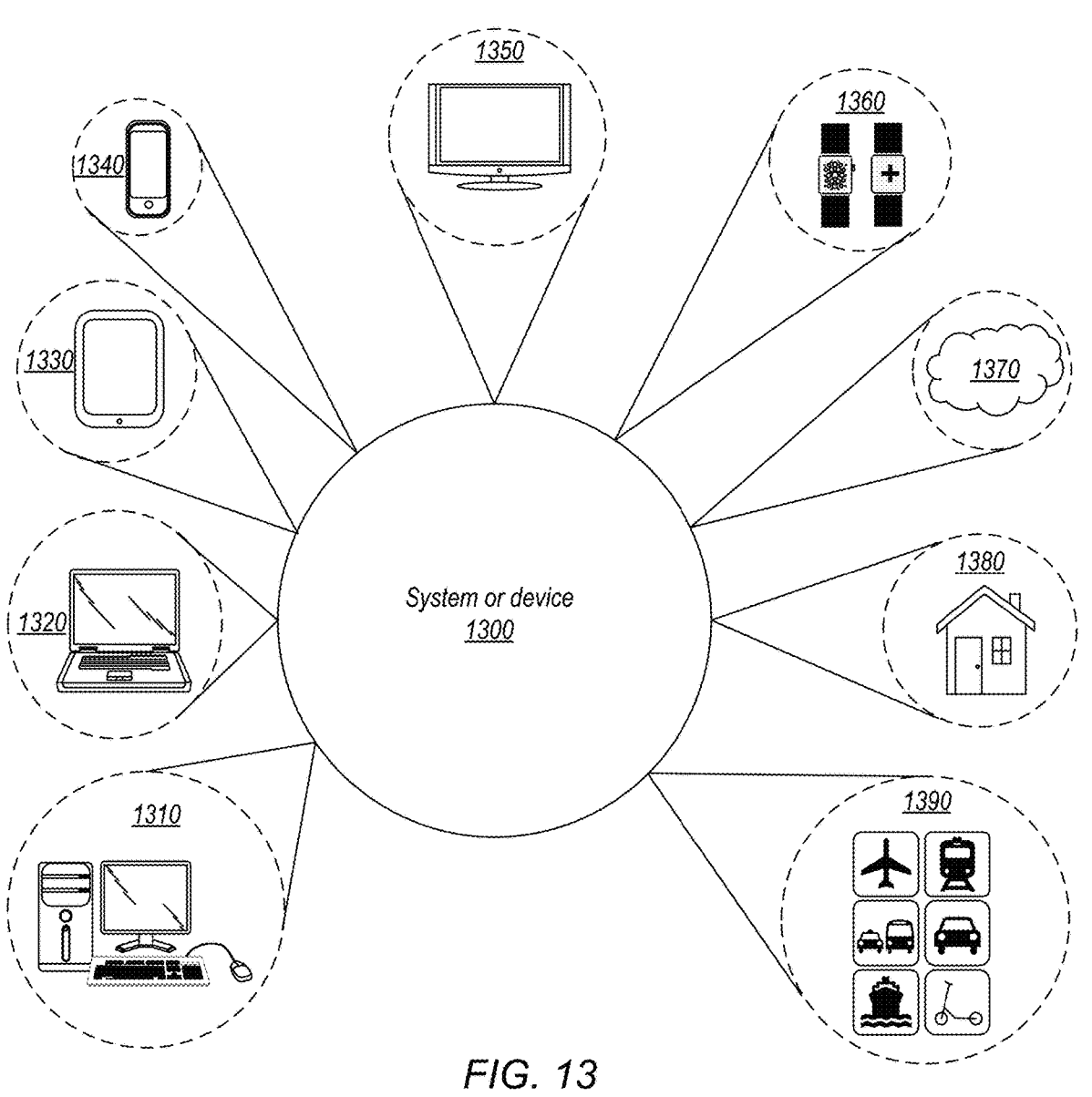
FIG. 13 is a diagram illustrating example applications for systems and devices employing the disclosed techniques.

Turning now to FIG. 13, various types of systems that may include any of the circuits, devices, or system discussed above. System or device 1300, which may incorporate or otherwise utilize one or more of the techniques described herein, may be utilized in a wide range of areas. For example, system or device 1300 may be utilized as part of the hardware of systems such as a desktop computer 1310, laptop computer 1320, tablet computer 1330, cellular or mobile phone 1340, or television 1350 (or set-top box coupled to a television).

Similarly, disclosed elements may be utilized in a wearable device 1360, such as a smartwatch or a health-monitoring device. Smartwatches, in many embodiments, may implement a variety of different functions—for example, access to email, cellular service, calendar, health monitoring, etc. A wearable device may also be designed solely to perform health-monitoring functions, such as monitoring a user's vital signs, performing epidemiological functions such as contact tracing, providing communication to an emergency medical service, etc. Other types of devices are also contemplated, including devices worn on the neck, devices implantable in the human body, glasses or a helmet designed to provide computer-generated reality experiences such as those based on augmented and/or virtual reality, etc.

System or device 1300 may also be used in various other contexts. For example, system or device 1300 may be utilized in the context of a server computer system, such as a dedicated server or on shared hardware that implements a cloud-based service 1370. Still further, system or device 1300 may be implemented in a wide range of specialized everyday devices, including devices 1380 commonly found in the home such as refrigerators, thermostats, security cameras, etc. The interconnection of such devices is often referred to as the "Internet of Things" (IoT). Elements may also be implemented in various modes of transportation. For example, system or device 1300 could be employed in the control systems, guidance systems, entertainment systems, etc. of various types of vehicles 1390.

The applications illustrated in FIG. 13 are merely exemplary and are not intended to limit the potential future applications of disclosed systems or devices. Other example applications include, without limitation: portable gaming devices, music players, data storage devices, unmanned aerial vehicles, etc.

Example Computer-Readable Medium

The present disclosure has described various example circuits in detail above. It is intended that the present disclosure cover not only embodiments that include such circuitry, but also a computer-readable storage medium that includes design information that specifies such circuitry. Accordingly, the present disclosure is intended to support claims that cover not only an apparatus that includes the disclosed circuitry, but also a storage medium that specifies the circuitry in a format that programs a computing system to generate a simulation model of the hardware circuit, programs a fabrication system configured to produce hardware (e.g., an integrated circuit) that includes the disclosed circuitry, etc. Claims to such a storage medium are intended to cover, for example, an entity that produces a circuit design, but does not itself perform complete operations such as: design simulation, design synthesis, circuit fabrication, etc.

Figure 14:
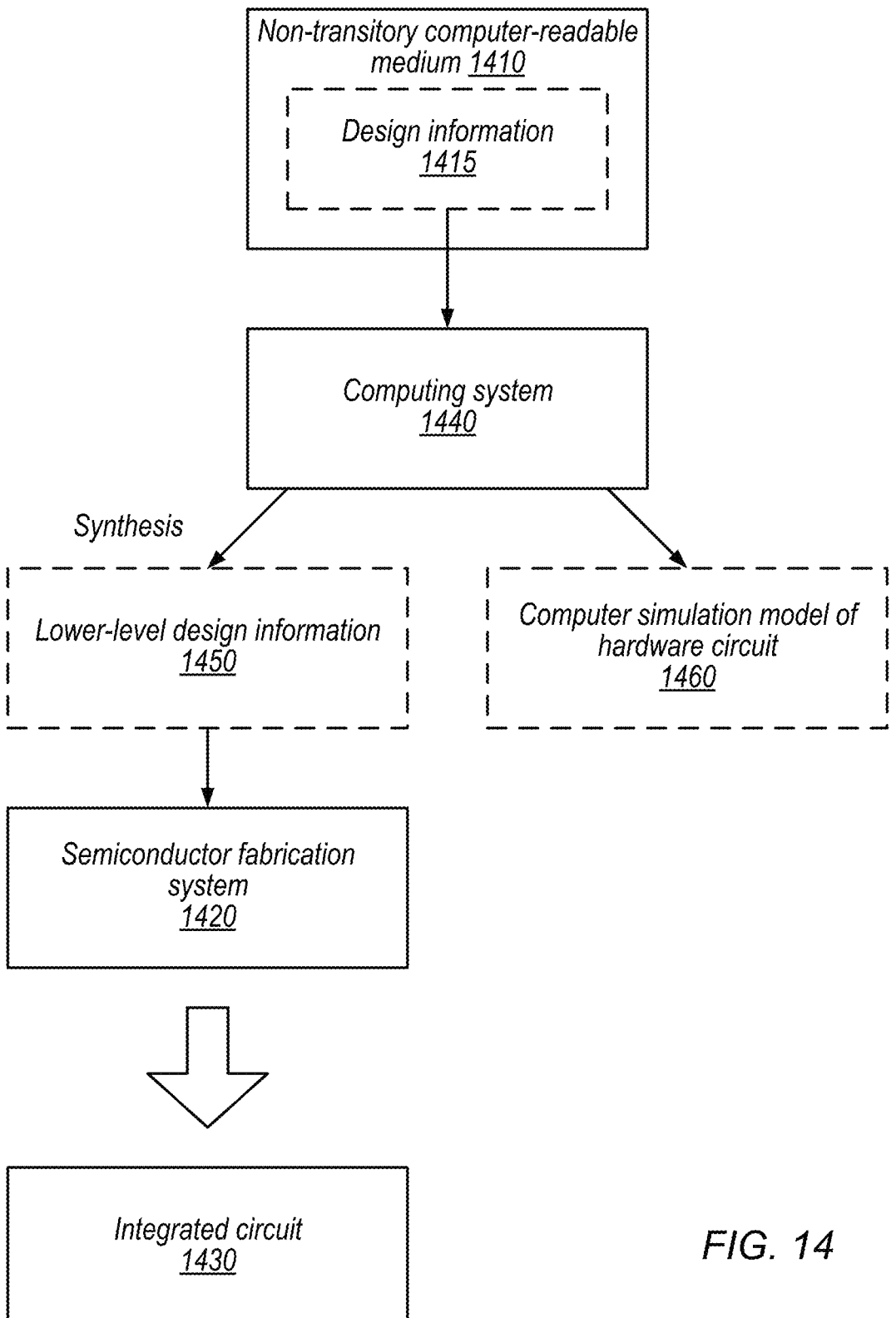
FIG. 14 is a block diagram illustrating an example computer-readable medium that stores circuit design information for implementing devices that employ the disclosed techniques.

FIG. 14 is a block diagram illustrating an example non-transitory computer-readable storage medium that stores circuit design information, according to some embodiments. In the illustrated embodiment, computing system 1440 is configured to process the design information. This may include executing instructions included in the design information, interpreting instructions included in the design information, compiling, transforming, or otherwise updating the design information, etc. Therefore, the design information controls computing system 1440 (e.g., by programming computing system 1440) to perform various operations discussed below, in some embodiments.

In the illustrated example, computing system 1440 processes the design information to generate both a computer simulation model of a hardware circuit 1460 and lower-level design information 1450. In other embodiments, computing system 1440 may generate only one of these outputs, may generate other outputs based on the design information, or both. Regarding the computing simulation, computing system 1440 may execute instructions of a hardware description language that includes register transfer level (RTL) code, behavioral code, structural code, or some combination thereof. The simulation model may perform the functionality specified by the design information, facilitate verification of the functional correctness of the hardware design, generate power consumption estimates, generate timing estimates, etc.

In the illustrated example, computing system 1440 also processes the design information to generate lower-level design information 1450 (e.g., gate-level design information, a netlist, etc.). This may include synthesis operations, as shown, such as constructing a multi-level network, optimizing the network using technology-independent techniques, technology dependent techniques, or both, and outputting a network of gates (with potential constraints based on available gates in a technology library, sizing, delay, power, etc.). Based on lower-level design information 1450 (potentially among other inputs), semiconductor fabrication system 1420 is configured to fabricate an integrated circuit 1430 (which may correspond to functionality of the simulation model 1460). Note that computing system 1440 may generate different simulation models based on design information at various levels of description, including information 1450, 1415, and so on. The data representing design information 1450 and model 1460 may be stored on medium 1410 or on one or more other media.

In some embodiments, the lower-level design information 1450 controls (e.g., programs) the semiconductor fabrication system 1420 to fabricate the integrated circuit 1430. Thus, when processed by the fabrication system, the design information may program the fabrication system to fabricate a circuit that includes various circuitry disclosed herein.

Non-transitory computer-readable storage medium 1410, may comprise any of various appropriate types of memory devices or storage devices. Non-transitory computer-readable storage medium 1410 may be an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Non-transitory computer-readable storage medium 1410 may include other types of non-transitory memory as well or combinations thereof. Accordingly, non-transitory computer-readable storage medium 1410 may include two or more memory media; such media may reside in different locations—for example, in different computer systems that are connected over a network.

Design information 1415 may be specified using any of various appropriate computer languages, including hardware description languages such as, without limitation: VHDL, Verilog, SystemC, System Verilog, RHDL, M, MyHDL, etc. The format of various design information may be recognized by one or more applications executed by computing system 1440, semiconductor fabrication system 1420, or both. In some embodiments, design information may also include one or more cell libraries that specify the synthesis, layout, or both of integrated circuit 1430. In some embodiments, the design information is specified in whole or in part in the form of a netlist that specifies cell library elements and their connectivity. Design information discussed herein, taken alone, may or may not include sufficient information for fabrication of a corresponding integrated circuit. For example, design information may specify the circuit elements to be fabricated but not their physical layout. In this case, design information may be combined with layout information to actually fabricate the specified circuitry.

Integrated circuit 1430 may, in various embodiments, include one or more custom macrocells, such as memories, analog or mixed-signal circuits, and the like. In such cases, design information may include information related to included macrocells. Such information may include, without limitation, schematics capture database, mask design data, behavioral models, and device or transistor level netlists. Mask design data may be formatted according to graphic data system (GDSII), or any other suitable format.

Semiconductor fabrication system 1420 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 1420 may also be configured to perform various testing of fabricated circuits for correct operation.

In various embodiments, integrated circuit 1430 and model 1460 are configured to operate according to a circuit design specified by design information 1415, which may include performing any of the functionality described herein. For example, integrated circuit 1430 might include any of various elements shown in FIGS. 1 and 7. Further, integrated circuit 1430 may be configured to perform various functions described herein in conjunction with other components. Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components. Similarly, stating "instructions of a hardware description programming language" that are "executable" to program a computing system to generate a computer simulation model" does not imply that the instructions must be executed in order for the element to be met, but rather specifies characteristics of the instructions. Additional features relating to the model (or the circuit represented by the model) may similarly relate to characteristics of the instructions, in this context. Therefore, an entity that sells a computer-readable medium with instructions that satisfy recited characteristics may provide an infringing product, even if another entity actually executes the instructions on the medium.

Note that a given design, at least in the digital logic context, may be implemented using a multitude of different gate arrangements, circuit technologies, etc. As one example, different designs may select or connect gates based on design tradeoffs (e.g., to focus on power consumption, performance, circuit area, etc.). Further, different manufacturers may have proprietary libraries, gate designs, physical gate implementations, etc. Different entities may also use different tools to process design information at various layers (e.g., from behavioral specifications to physical layout of gates).

Once a digital logic design is specified, however, those skilled in the art need not perform substantial experimentation or research to determine those implementations. Rather, those of skill in the art understand procedures to reliably and predictably produce one or more circuit implementations that provide the function described by the design information. The different circuit implementations may affect the performance, area, power consumption, etc. of a given design (potentially with tradeoffs between different design goals), but the logical function does not vary among the different circuit implementations of the same circuit design.

In some embodiments, the instructions included in the design information instructions provide RTL information (or other higher-level design information) and are executable by the computing system to synthesize a gate-level netlist that represents the hardware circuit based on the RTL information as an input. Similarly, the instructions may provide behavioral information and be executable by the computing system to synthesize a netlist or other lower-level design information. The lower-level design information may program fabrication system 1420 to fabricate integrated circuit 1430.

The present disclosure includes references to an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more of the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements may be defined by the functions or operations that they are configured to implement. The arrangement of such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used to transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g., passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

What is claimed is:

1. An apparatus, comprising:
a memory controller circuit of a computer system that includes, on one or more co-packaged integrated circuits (ICs):
a memory cache circuit;
a plurality of storage circuits; and
control circuitry configured to manage access to the memory cache circuit and a portion of a system memory by reserving ones of the plurality of storage circuits, wherein the control circuitry, in response to receiving a memory access request, is configured to attempt to reserve, prior to a determination of whether the memory access request hits in the memory cache circuit, entries in a first set of the plurality of storage circuits that are needed to process a cache hit, without reserving entries in other sets of storage circuits of the plurality of storage circuits that are needed to process other possible outcomes of the memory access request, including a cache miss; and
wherein the control circuitry is configured to initiate processing of the memory access request based on successfully reserving entries in all of the first set of storage circuits, and to inhibit processing of the memory access request based on being unable to reserve an entry in at least one of the first set of storage circuits; and
wherein the other sets of storage circuits of the plurality of storage circuits include a different set of storage circuits used to process a cache miss, and wherein the control circuitry is configured to reserve entries in the different set of storage circuits after initiation of the memory access request and in response to a determination of the cache miss.

2. The apparatus of claim 1, wherein the control circuitry includes:
a tag pipeline circuit configured to determine if the memory access request hits in the memory cache circuit.

3. The apparatus of claim 2, wherein the first set of the plurality of storage circuits includes a retry queue circuit having a plurality of entries configured to store information for those memory access requests that are determined, during a given pass through the tag pipeline circuit, to require another pass through the tag pipeline circuit.

4. The apparatus of claim 3, wherein the control circuitry, in response to the tag pipeline circuit detecting a cache hit to the memory cache circuit for the memory access request, is configured to:

complete, using entries in the first set of storage circuits that have been reserved, the memory access request; and release a reserved entry in the retry queue circuit in response to the tag pipeline circuit detecting the cache hit for the memory access request.

5. The apparatus of claim 3, wherein the control circuitry, in response to the tag pipeline circuit detecting a cache miss for the memory access request and making a determination of availability of storage circuits other than those in the first set that are needed to complete the memory access request, is configured to:

release a reserved entry in the retry queue circuit; and release any other entries in the first set of storage circuits that are not needed to complete the memory access request.

6. The apparatus of claim 3, wherein the control circuitry, in response to the tag pipeline circuit detecting a cache miss for the memory access request and making a determination of lack of availability of storage circuits other than those in the first set that are needed to complete the memory access request, is configured to store information relating to the memory access request to a reserved entry in the retry queue circuit, wherein the control circuitry is configured to cause the memory access request to be retried from the retry queue circuit at a later point in time.

7. The apparatus of claim 2, wherein the first set of the plurality of storage circuits also includes a cache hit output buffer configured to store information resulting from a hit in the memory cache circuit.

8. The apparatus of claim 2, wherein the first set of the plurality of storage circuits includes:

a data pipe queue circuit configured to store information being sent from the tag pipeline circuit to a data pipe circuit in response to a determination of a cache hit, the data pipe circuit being configured to store write data to be sent to the memory cache circuit and to store read data to be retrieved from the memory cache circuit; and a read data buffer circuit configured to store information relating to a cache hit for a read-modify-write instruction.

9. The apparatus of claim 1, wherein the other sets of storage circuits of the plurality of storage circuits include a second set of storage circuits that includes a snoop queue circuit configured to store information relating to snoops generated by memory access requests, and wherein the control circuitry is configured to reserve entries in the second set of storage circuits after determining that a particular snoop has been generated for a particular memory access request.

10. A method, comprising:

receiving, at a memory controller circuit of a computer system with one or more co-packaged integrated circuits (ICs), a memory access request, wherein the memory controller circuit includes a memory cache circuit;

attempting to reserve, by the memory controller circuit, entries in a first set of a plurality of storage circuits within the memory controller circuit that are needed to process a cache hit in the memory cache circuit, without attempting to reserve other ones of the plurality of storage circuits that would be needed to be reserved in response to the memory access request generating a snoop or a cache miss, wherein the first set of storage circuits includes a retry queue circuit configured to store information for memory access requests that are determined, during a given pass through the memory controller circuit, to require another pass through the memory controller circuit;

in response to successfully reserving entries in the first set of storage circuits, initiating, by the memory controller circuit, the memory access request; and determining, by the memory controller circuit, whether the memory access request results in a cache hit in the memory cache circuit; and wherein the other ones of the plurality of storage circuits include a different set of storage circuits used to process a cache miss, and wherein the control circuitry is configured to reserve entries in the different set of storage circuits after initiation of the memory access request and in response to a determination of the cache miss.

11. The method of claim 10, further comprising:

detecting, by the memory controller circuit, a cache hit to the memory cache circuit for the memory access request;

in response to the detecting the cache hit and determining that the memory access request does not require a snoop to complete:

completing the memory access request using entries in the first set of storage circuits that have been reserved; and releasing a reserved entry in the retry queue circuit for the memory access request.

12. The method of claim 10, further comprising:

detecting, by the memory controller circuit, a cache hit to the memory cache circuit for the memory access request;

in response to the detecting the cache hit and determining that the memory access request requires a snoop to complete:

reserving an entry in a snoop queue circuit, wherein the snoop queue circuit is not one of the first set of storage circuits; and completing the memory access request using the reserved entry in the snoop queue circuit.

13. The method of claim 10, further comprising:

detecting, by the memory controller circuit, a cache miss to the memory cache circuit for the memory access request;

making, by the memory controller circuit, a determination of availability of entries in a second set of the plurality of storage circuits that are needed to complete the memory access request, the second set differing from the first set; and in response to detecting the cache miss and the determination of availability:

releasing a reserved entry in the retry queue circuit; and releasing any other entries in the first set of storage circuits not needed to complete the memory access request.

14. The method of claim 10, further comprising:

detecting, by the memory controller circuit, a cache miss to the memory cache circuit for the memory access request;

making, by the memory controller circuit, a determination of unavailability of one or more entries in a second set of the plurality of storage circuits that are needed to complete the memory access request, the second set differing from the first set; and in response to detecting the cache miss and the determination of unavailability:

storing information relating to the memory access request to a reserved entry in the retry queue circuit, wherein the memory controller circuit is configured to cause the memory access request to be retried from the retry queue circuit at a later point in time.

15. An apparatus, comprising:

a computer system that includes, on one or more co-packaged integrated circuits (ICs):

a plurality of memory plane controller circuits, wherein a given one of the plurality of memory plane controller circuits includes:

a memory cache circuit;

a plurality of storage circuits; and control circuitry configured to:

receive a memory access request from a network of the computer system;

attempt to reserve a first set of resources in the plurality of storage circuits that are needed to complete a cache hit, without attempting to reserve other sets of resources needed in case of a cache miss or a snoop, the first set of resources including an entry in a retry queue circuit that is configured to store information for memory access requests that are determined, during a given pass through the given memory plane controller circuit, to require another pass through the given memory plane controller circuit;

initiate processing of the memory access request based on successfully reserving the first set of resources;

inhibit processing of the memory access request based on not successfully reserving at least one of the first set of resources; and in response to detecting a cache hit for the memory access request, complete the memory access request and release a reservation for the retry queue circuit wherein the other sets of resources of the plurality of storage circuits include a different set of storage circuits used to process a cache miss, and wherein the control circuitry is configured to reserve entries in the different set of storage circuits after initiation of the memory access request and in response to a determination of the cache miss.

16. The apparatus of claim 15, wherein the first set of resources includes an entry in a read buffer circuit configured to store data associated with a read-modify-write command that is a hit in the memory cache circuit.

17. The apparatus of claim 15, wherein the control circuitry is configured to:

detect a cache miss to the memory cache circuit for the memory access request;

make a determination of unavailability of entries in storage circuits other than those in the first set that are needed to complete the memory access request; and in response to detecting the cache miss and the determination of unavailability:

store information relating to the memory access request in a reserved entry in the retry queue circuit, wherein the given memory plane controller circuit is configured to cause the memory access request to be retried from the retry queue circuit at a later point in time.

18. The apparatus of claim 15, wherein the control circuitry includes an arbitration circuit configured to:

reserve an entry in the retry queue circuit for the memory access request; and select the memory access request for issuance for processing by a pipeline circuit of the given memory plane controller circuit as a result of an arbitration process and based on availability of the entry in the retry queue circuit for reservation, thus ensuring that unavailability of the retry queue circuit will not cause the memory access request to be returned to the network for resubmission to the given memory plane controller circuit.

19. The apparatus of claim 18, wherein the network is one of a plurality of networks within the computer system, and wherein the given memory plane controller circuit is configured to receive the memory access request from a particular one of a plurality of network interface (NI) circuits coupled to the given memory plane controller circuit, a given one of plurality of NI circuits being coupled to a respective one of the plurality of networks, and the particular NI circuit being coupled to the network.

20. An apparatus, comprising:

a memory controller circuit of a computer system that includes, on one or more co-packaged integrated circuits (ICs):

a memory cache circuit;

a plurality of storage circuits; and control circuitry configured to manage access to the memory cache circuit and a portion of a system memory by reserving ones of the plurality of storage circuits, wherein the control circuitry, in response to receiving a memory access request, is configured to attempt to reserve, prior to a determination of whether the memory access request hits in the memory cache circuit, entries in a first set of the plurality of storage circuits that are needed to process a cache hit, without reserving entries in other sets of storage circuits of the plurality of storage circuits that are needed to process other possible outcomes of the memory access request, including a cache miss; and wherein the control circuitry is configured to initiate processing of the memory access request based on successfully reserving entries in all of the first set of storage circuits, and to inhibit processing of the memory access request based on being unable to reserve an entry in at least one of the first set of storage circuits; and wherein the other sets of storage circuits of the plurality of storage circuits include a second set of storage circuits that includes a snoop queue circuit configured to store information relating to snoops generated by memory access requests, and wherein the control circuitry is configured to reserve entries in the second set of storage circuits after determining that a particular snoop has been generated for a particular memory access request.

* * * * *